(12) United States Patent
Hunstable

(10) Patent No.: US 10,439,452 B2
(45) Date of Patent: Oct. 8, 2019

(54) MULTI-TUNNEL ELECTRIC MOTOR/GENERATOR

(71) Applicant: LINEAR LABS, LLC, Granbury, TX (US)

(72) Inventor: Fred E. Hunstable, Granbury, TX (US)

(73) Assignee: LINEAR LABS, LLC, Fort Worth, TX (US)

( * ) Notice: Subject to any disclaimer, the term of this patent is extended or adjusted under 35 U.S.C. 154(b) by 0 days.

(21) Appl. No.: 16/374,132

(22) Filed: Apr. 3, 2019

(65) Prior Publication Data
US 2019/0229563 A1 Jul. 25, 2019

Related U.S. Application Data

(63) Continuation of application No. 15/657,173, filed on Jul. 23, 2017, now Pat. No. 10,256,680, which is a
(Continued)

(51) Int. Cl.
*H02K 47/00* (2006.01)
*H02K 1/02* (2006.01)
(Continued)

(52) U.S. Cl.
CPC ............ *H02K 1/02* (2013.01); *H02K 1/27* (2013.01); *H02K 3/12* (2013.01); *H02K 3/18* (2013.01);
(Continued)

(58) Field of Classification Search
CPC ........ H02K 16/00; H02K 47/04; H02K 16/02; H02K 47/20; H02K 16/025; H02K 47/14
(Continued)

(56) References Cited

U.S. PATENT DOCUMENTS

| 2,703,370 A | 3/1955 | Steensen |
| 3,300,663 A | 1/1967 | Rosaen |

(Continued)

FOREIGN PATENT DOCUMENTS

| CN | 2226352 Y | 5/1996 |
| CN | 2452204 Y | 10/2001 |

(Continued)

OTHER PUBLICATIONS

Aydin, Metin, et al., "Design and 3D Electromagnetic Field Anaylsis of Non-slotted and Slotted Torus Type Axial Flux Surface Mounted Permanent Magnet Disc Machines," IEEE International Electric Machines and Drives conference, Jun. 17-20, 2001, pp. 645-651.
(Continued)

*Primary Examiner* — Thanh Lam
(74) *Attorney, Agent, or Firm* — Bill R. Naifeh

(57) ABSTRACT

Disclosed are various embodiments for a new and improved electrical motor/generator, specifically a motor/generator comprising: a plurality of coils radially positioned about a coil assembly, a plurality of magnetic tunnels forming a relative rotational path for the coil assembly, wherein the all of plurality of magnets forming each magnetic tunnel have like poles facing inward toward the interior of the magnetic tunnel or facing outward away from the interior of the magnetic tunnel such that each magnetic field of any magnetic tunnel is of an opposite polarity to the magnetic field of an adjacent magnetic tunnel.

19 Claims, 20 Drawing Sheets

Related U.S. Application Data continuation of application No. 15/492,529, filed on Apr. 20, 2017, now Pat. No. 9,729,016, which is a continuation-in-part of application No. PCT/US2016/026776, filed on Apr. 8, 2016, and a continuation-in-part of application No. 14/866,788, filed on Sep. 25, 2015, now Pat. No. 10,263,480, which is a continuation-in-part of application No. 13/848,048, filed on Mar. 20, 2013, now Pat. No. 9,419,483.

(60) Provisional application No. 62/173,349, filed on Jun. 9, 2015, provisional application No. 62/167,412, filed on May 28, 2015, provisional application No. 62/144,654, filed on Apr. 8, 2015, provisional application No. 62/056,389, filed on Sep. 26, 2014, provisional application No. 62/055,615, filed on Sep. 25, 2014, provisional application No. 62/055,612, filed on Sep. 25, 2014, provisional application No. 61/613,022, filed on Mar. 20, 2012.

(51) Int. Cl.
   H02K 3/18     (2006.01)
   H02K 1/27     (2006.01)
   H02K 21/12    (2006.01)
   H02K 21/24    (2006.01)
   H02K 3/12     (2006.01)
   H02K 21/14    (2006.01)
   H02K 21/22    (2006.01)

(52) U.S. Cl.
   CPC ............ H02K 21/12 (2013.01); H02K 21/24 (2013.01); *H02K 1/278* (2013.01); *H02K 1/2786* (2013.01); *H02K 1/2793* (2013.01); *H02K 21/14* (2013.01); *H02K 21/22* (2013.01)

(58) Field of Classification Search
   USPC ................. 310/112–114, 179–180, 266, 310/156.01–156.83
   See application file for complete search history.

(56) References Cited

U.S. PATENT DOCUMENTS

| | | | |
|---|---|---|---|
| 3,469,133 A | 9/1969 | Stcherbatcheff | |
| 3,895,245 A | 7/1975 | Bode | |
| 3,979,619 A | 9/1976 | Whiteley | |
| 4,237,396 A | 12/1980 | Blenkinsop | |
| 4,388,547 A | 6/1983 | Gruber | |
| 4,441,043 A | 4/1984 | DeCesare | |
| 4,488,075 A | 12/1984 | DeCesare | |
| 4,547,713 A | 10/1985 | Langley et al. | |
| 4,629,921 A | 12/1986 | Gavaletz | |
| 4,814,651 A | 3/1989 | Elris | |
| 5,004,944 A | 4/1991 | Fisher | |
| 5,099,158 A | 3/1992 | Stuart et al. | |
| 5,594,289 A | 1/1997 | Minato | |
| 5,691,589 A | 11/1997 | Keim et al. | |
| 5,886,450 A | 2/1999 | Kuehnle | |
| 5,962,947 A | 10/1999 | Suzuki et al. | |
| 5,977,684 A | 11/1999 | Lin | |
| 6,054,834 A | 4/2000 | Ha | |
| 6,093,986 A * | 7/2000 | Windhorn | H02K 11/0094 310/114 |
| 6,104,108 A | 8/2000 | Hazelton | |
| 6,211,597 B1 * | 4/2001 | Nakano | H02K 16/02 310/114 |
| 6,388,352 B1 | 5/2002 | Huang | |
| 6,531,799 B1 | 3/2003 | Miller | |
| 6,664,689 B2 | 12/2003 | Rose | |
| 6,664,704 B2 | 12/2003 | Calley | |
| 6,774,591 B2 | 8/2004 | Arimitsu et al. | |
| 6,803,691 B2 | 10/2004 | Rose | |
| 6,806,607 B2 | 10/2004 | Lau | |
| 6,891,299 B2 | 5/2005 | Coupart | |
| 6,924,574 B2 | 8/2005 | Qu et al. | |
| 6,924,579 B2 | 8/2005 | Calley | |
| 6,930,421 B2 | 8/2005 | Rose | |
| 6,930,422 B2 | 8/2005 | Rose | |
| 6,967,424 B2 | 11/2005 | Popov | |
| 6,979,925 B2 | 12/2005 | Schwamm | |
| 7,049,722 B2 | 5/2006 | Rose | |
| 7,233,088 B2 | 6/2007 | Wise | |
| 7,279,818 B1 | 10/2007 | Wise | |
| 7,315,103 B2 | 1/2008 | Qu | |
| 7,348,703 B2 | 3/2008 | Bojiuc | |
| 7,378,749 B2 | 5/2008 | Moore | |
| 7,554,241 B2 | 6/2009 | Rao | |
| 7,732,973 B2 | 6/2010 | Bojiuc | |
| 7,755,244 B2 | 7/2010 | Ley et al. | |
| 7,765,905 B2 | 8/2010 | Trumper | |
| 7,791,242 B2 | 9/2010 | Bojiuc | |
| 7,834,503 B2 | 11/2010 | Bojiue | |
| 7,898,134 B1 * | 3/2011 | Shaw | H02K 1/148 310/112 |
| 8,008,821 B2 | 8/2011 | Calley | |
| 8,063,528 B2 | 11/2011 | Toot | |
| 8,074,922 B2 | 12/2011 | Bojiuc | |
| 8,159,104 B1 | 4/2012 | Bojiuc | |
| 8,232,695 B2 | 7/2012 | Bojiuc | |
| 3,288,916 A1 | 10/2012 | Quere | |
| 8,362,731 B2 | 1/2013 | Smith | |
| 8,400,037 B2 | 3/2013 | Wojtowicz | |
| 8,415,848 B2 | 4/2013 | Calley | |
| 8,598,754 B2 | 12/2013 | Lacour | |
| 8,912,699 B2 | 12/2014 | Kuntz | |
| 9,219,962 B2 | 12/2015 | Hunstable | |
| 9,419,483 B2 | 8/2016 | Hunstable | |
| RE46,449 E | 6/2017 | Bojiuc | |
| 9,729,016 B1 | 8/2017 | Hunstable | |
| 9,825,496 B2 | 11/2017 | Hunstable | |
| 10,256,680 B2 | 4/2019 | Hunstable | |
| 10,263,480 B2 | 4/2019 | Hunstable | |
| 10,284,029 B2 | 5/2019 | Hunstable | |
| 2003/0025417 A1 | 2/2003 | Rose | |
| 2004/0027022 A1 | 2/2004 | Weir | |
| 2004/0061397 A1 | 4/2004 | Rose | |
| 2004/0194286 A1 | 10/2004 | Rose | |
| 2004/0195932 A1 | 10/2004 | Rose | |
| 2004/0195933 A1 | 10/2004 | Rose | |
| 2004/0232800 A1 | 11/2004 | Seguchi et al. | |
| 2005/0194855 A1 | 9/2005 | Hasebe | |
| 2006/0038454 A1 | 2/2006 | Bojiuc | |
| 2006/0273686 A1 * | 12/2006 | Edelson | H02K 3/12 310/266 |
| 2007/0228860 A1 | 10/2007 | Rao | |
| 2008/0278019 A1 | 11/2008 | Lu et al. | |
| 2009/0102305 A1 | 4/2009 | Lu | |
| 2009/0224627 A1 | 9/2009 | Hino et al. | |
| 2009/0224628 A1 | 9/2009 | Hiwaki et al. | |
| 2009/0261675 A1 | 10/2009 | Hsiao et al. | |
| 2010/0164422 A1 | 7/2010 | Shu et al. | |
| 2010/0289365 A1 | 11/2010 | Bando et al. | |
| 2011/0187222 A1 | 8/2011 | Li et al. | |
| 2012/0153763 A1 | 6/2012 | Kenji | |
| 2012/0286616 A1 | 11/2012 | Li | |
| 2013/0249343 A1 | 9/2013 | Hunstable | |
| 2014/0070651 A1 | 3/2014 | Gelfast | |
| 2014/0191612 A1 | 7/2014 | Mariotto | |
| 2015/0001976 A1 | 1/2015 | Hunstable | |
| 2015/0137647 A1 | 5/2015 | Hunstable | |
| 2015/0171694 A1 | 6/2015 | Walsh | |
| 2016/0020652 A1 | 1/2016 | Hunstable | |
| 2016/0094096 A1 | 3/2016 | Hunstable | |
| 2016/0380496 A1 | 12/2016 | Hunstable | |
| 2017/0237325 A1 | 8/2017 | Hunstable | |
| 2018/0131244 A1 | 5/2018 | Hunstable | |
| 2018/0212486 A1 | 7/2018 | Hunstable | |
| 2018/0278134 A1 | 9/2018 | Hunstable | |
| 2018/0331593 A1 | 11/2018 | Hunstable | |

(56) References Cited

U.S. PATENT DOCUMENTS

FOREIGN PATENT DOCUMENTS

| DE | 102010024344 A1 | 12/2011 |
|----|-----------------|---------|
| EP | 1191673 A2 | 3/2002 |
| EP | 1990894 A2 | 11/2008 |
| JP | 351133709 | 11/1976 |
| JP | 55492305 | 12/1977 |
| JP | 561173658 A | 8/1986 |
| JP | 561144782 | 9/1986 |
| JP | 2002369473 A | 12/2002 |
| JP | 2006217771 A | 8/2006 |
| JP | 2010166741 A | 7/2010 |
| KR | 101276633 B1 | 6/2013 |
| WO | 2008096913 A1 | 8/2008 |
| WO | 2011032675 A2 | 3/2011 |
| WO | 2016164818 A1 | 10/2016 |
| WO | 2017003955 A1 | 1/2017 |
| WO | 2017070403 A1 | 4/2017 |
| WO | 2018045360 A1 | 3/2018 |

OTHER PUBLICATIONS

Aydin, Metin, et al., "Performance Evaluation of an Axial Flux Consequent Pole PM Motor using Finite Element Analysis," IEEE International Electric Machines and Drives Conference, vol. 3, Jun. 1-4, 2003, pp. 1682-1687.
Huang, Surong, et al., "Torus Concept Machines: Pre-Prototyping Design Assessment for Two Major Topologies," IEEE Industry Applications Conference, vol. 3, Sep. 30-Oct. 4, 2001, pp. 1619-1625.
Australian Exam Report, dated May 10, 2016, re Patent App No. 2013235132; 3 pages.
Chinese Office Action, dated Jul. 20, 2016, re Patent App No. 201380022180.7; 9 pages.
Japanese Office Action, dated Jan. 25, 2017, re JP Patent App No. 2015-501894.
International Search Report and Written Opinion of the ISA, dated Aug. 8, 2014, re PCT/US2013/033198.
International Search Report and Written Opinion of the ISA, dated Aug. 18, 2016, re PCT/US2016/026776.
International Search Report and Written Opinion, dated Nov. 3, 2016, by the ISA/RU, re PCT/US2016/039673.
International Search Report and Written Opinion, dated Jan. 9, 2017, by the ISA/US, re PCT/US2016/057999.
Chinese Office Action, dated Apr. 19, 2017, re CN App No. 201380022180.7.
Office Action, dated Jul. 21, 2017, by the USPTO, re U.S. Appl. No. 15/413,228.
Final Office Action, dated Mar. 9, 2018, by the USPTO, re U.S. Appl. No. 15/413,228.
International Search Report and Written Opinion, dated Mar. 15, 2018, by the ISA/RU, re PCT/US2017/049981.
Office Action, dated Jun. 27, 2018, by the USPTO, re U.S. Appl. No. 15/008,431.
Office Action, dated Sep. 19, 2018, by the Uspto, re U.S. Appl. No. 15/413,228.
EP Exam Report, dated Apr. 18, 2018, by the EPO, re EP App No. 13714168.5.
EP Search Report, dated Oct. 26, 2018, re EP Patent App No. 16777421.5.
EP Official Action, dated Nov. 13, 2018, by the EPO, re EP App No. 16777421.5.
EP Exam Report, dated Oct. 10, 2018, by the EPO, re EP App No. 13714168.5.
Indian Exam Report, dated Nov. 19, 2018, by IP India, re IN App No. 8335/DELNP/2014.
CA Office Action, dated Jan. 24, 2019, by the CIPO, re CA App No. 2,881,979.
Office Action, dated Feb. 25, 2019, by the USPTO, re U.S. Appl. No. 15/848,540.
EP Extended Search Report, dated Feb. 22, 2019, by the EPO, re EP App No. 16818559.3.
Notice of Allowance, dated Mar. 6, 2019, by the USPTO, re U.S. Appl. No. 15/008,431.
EP Office Action, dated Mar. 12, 2019, by the EPO, re EP App No. 16818559.3.
Notice of Allowance, dated Apr. 10, 2019, by the USPTO, re U.S. Appl. No. 15/413,228.
Extended EP Search Report, dated Apr. 18, 2019, by the EPO, re EP App No. 16858253.4.
Chinese Office Action, dated Apr. 10, 2019, by the CIPO, re CN App No. 201680033171.1.
EP Official Action, dated May 8, 2019, by the EPO, re EP Patent App No. 16858253.4.
Notice of Allowance, dated Jun. 12, 2019, by the USPTO, re U.S. Appl. No. 15/848,540.
Office Action, dated Jun. 27, 2019, by the USPTO, re U.S. Appl. No. 15/813,360.
KR Office Action, dated Jun. 7, 2019, by KIPO, re KR Patent App No. 10-2014-7029089.

* cited by examiner

MULTI-TUNNEL ELECTRIC MOTOR/GENERATOR

RELATED APPLICATIONS

This application is a Continuation of U.S. patent application Ser. No. 15/657,173, entitled "An Improved Multi-Tunnel Electric Motor/Generator," filed Jul. 23, 2017, which is a Continuation of U.S. patent application Ser. No. 15/492,529, entitled "An Improved Multi-Tunnel Electric Motor/Generator," filed Apr. 20, 2017, which is a Continuation-in-Part of PCT International application serial number PCT/US2016/026776, entitled "An Improved Multi-Tunnel Electric Motor/Generator," filed on Apr. 8, 2016, which claims the benefit of U.S. provisional patent application Ser. No. 62/173,349 entitled "Multi-Tunnel Electric Motor/Generator," filed on Jun. 9, 2015; U.S. provisional patent application Ser. No. 62/167,412 entitled "Multi-Tunnel Electric Motor/Generator," filed on May 28, 2015; and U.S. provisional patent application Ser. No. 62/144,654 entitled "Multi-Tunnel Electric Motor/Generator," filed on Apr. 8, 2015, and said U.S. patent application Ser. No. 15/492,529, is also a Continuation-in-Part of U.S. patent application Ser. No. 14/866,788, entitled "Brushless Electric Motor/Generator," filed on Sep. 25, 2015, which claims the benefit of U.S. provisional patent application Ser. No. 62/056,389, entitled "DC Electric Motor/Generator with Enhanced Permanent Magnet Flux Densities," filed on Sep. 26, 2014; U.S. provisional patent application Ser. No. 62/055,615, entitled "DC Electric Motor/Generator with Enhanced Permanent Magnet Flux Densities," filed on Sep. 25, 2014; and U.S. provisional patent application Ser. No. 62/055,612, entitled "DC Electric Motor/Generator with Enhanced Permanent Magnet Flux Densities," filed on Sep. 25, 2014; and which is a Continuation-in-Part of U.S. patent application Ser. No. 13/848,048, entitled "DC Electric Motor/Generator with Enhanced Permanent Magnet Flux Densities," filed on Mar. 20, 2013, which claims the benefit of U.S. provisional patent application Ser. No. 61/613,022, entitled "Electric Motor/Generator," filed Mar. 20, 2012, of which all of the disclosures are hereby incorporated by reference for all purposes.

This application is also commonly owned with the following U.S. patent applications: U.S. patent application Ser. No. 15/413,228, entitled "Brushless Electric Motor/Generator," filed on Jan. 23, 2017; U.S. patent application Ser. No. 14/866,787, entitled "Brushed Electric Motor/Generator," filed on Sep. 25, 2015; U.S. patent application Ser. No. 14/608,232, entitled "Brushless Electric Motor/Generator," filed on Jan. 29, 2015; U.S. patent application Ser. No. 14/490,656, entitled "DC Electric Motor/Generator with Enhanced Permanent Magnetic Flux Densities," filed on Sep. 18, 2014, the disclosures of which are hereby incorporated by reference for all purposes.

TECHNICAL FIELD

The invention relates in general to a new and improved electric motor/generator, and in particular to an improved system and method for producing rotary motion from an electromagnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

In a traditional electric motor, a central core of tightly wrapped current carrying material creates magnetic poles (known as the rotor) spins or rotates at high speed between the fixed poles of a magnet (known as the stator) when an electric current is applied. The central core is typically coupled to a shaft which will also rotate with the rotor. The shaft may then be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

In most conventional motors, both linear and rotating, enough power of the proper polarity must be pulsed at the right time to supply an opposing (or attracting) force at each pole segment to produce a particular torque. In conventional motors at any given instant only a portion of the coil pole pieces is actively supplying torque.

With conventional motors, a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM. However output is a sinusoidal output which inherently has losses similar to that of conventional electric motors.

Specifically, the pulsed time varying magnetic fields produces undesired effects and losses, i.e. iron hysteresis losses, counter-EMF, inductive kickback, eddy currents, inrush currents, torque ripple, heat losses, cogging, brush losses, high wear in brushed designs, commutation losses and magnetic buffeting of permanent magnets. In many instances, complex controllers are used in place of mechanical commutation to address some of these effects.

Additionally, in motors or generators, some form of energy drives the rotation and/or movement of the rotor. As energy becomes more scarce and expensive, what is needed are more efficient motors and generators to reduce energy consumption, and hence costs.

SUMMARY

In response to these and other problems, there is presented various embodiments disclosed in this application, including methods and systems of increasing flux density by permanent magnet manipulation using multiple magnetic tunnels.

Disclosed are various embodiments for a motor/generator comprising: a plurality of coils radially positioned about a coil assembly, a plurality of magnetic tunnels forming a relative rotational path for the coil assembly, wherein the all of plurality of magnets forming each magnetic tunnel have like poles facing inward toward the interior of the magnetic tunnel or facing outward away from the interior of the magnetic tunnel such that each magnetic field of any magnetic tunnel is of an opposite polarity to the magnetic field of an adjacent magnetic tunnel.

These and other features, and advantages, will be more clearly understood from the following detailed description taken in conjunction with the accompanying drawings. It is important to note the drawings are not intended to represent the only aspects of the invention.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Motor/Generator Element and Back Iron Circuit

Figure 1A:
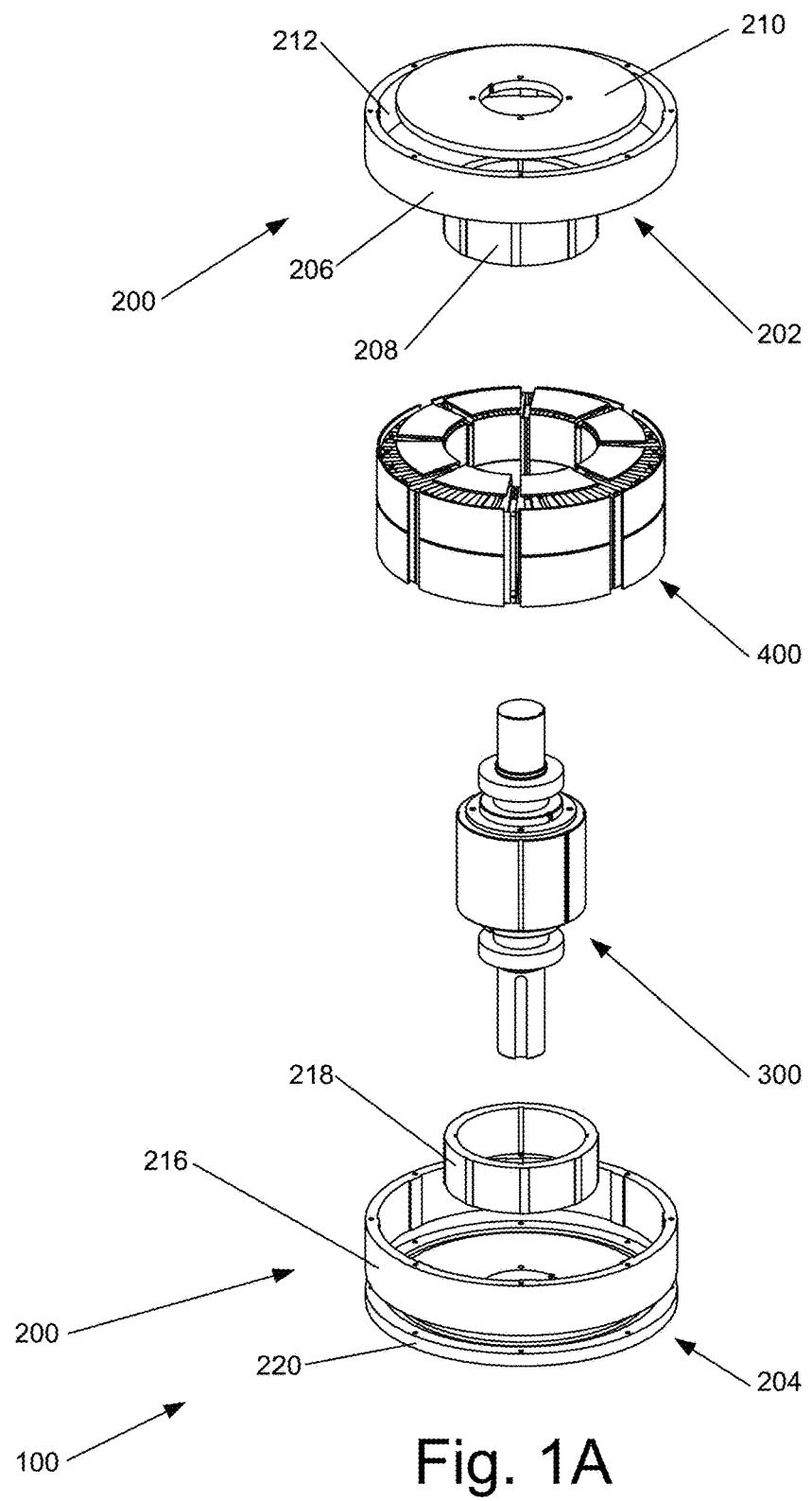
FIG. 1A is an exploded view of one embodiment of a motor/generator component according to certain aspects of the present disclosure.

FIG. 1A is an exploded isometric view of a motor/generator element 100 illustrating a first portion 202 of a back iron circuit 200, a second portion 204 of the back iron circuit 200, a rotor hub 300, and a magnetic disc assembly 400.

The back iron circuit 200 is theoretically optional. It serves to strengthen magnetic elements (described below) and constrain the magnetic circuit to limit reluctance by removing or reducing the return air path. The first portion 202 of the back iron circuit 200 comprises a first outer cylindrical wall 206 made of a suitable back iron material as described below. When the motor/generator element 100 is assembled, a first inner cylindrical wall 208 is concentrically positioned within the first outer cylindrical wall 206. A first flat side wall 210 which is also made of back iron material is positioned longitudinally next to the first outer cylindrical wall 206 and the first inner cylindrical wall 208.

A second portion of the back iron circuit includes a second inner cylinder wall 218 concentrically positioned within a second outer cylindrical wall 216 (when the motor/generator element 100 is assembled). A second flat side wall 220 of back iron material is positioned longitudinally next to the second outer cylindrical wall 216 and the second inner cylindrical wall 218. In certain embodiments, the second inner cylinder wall 218 and second outer cylinder wall 216 have a plurality of longitudinal grooves sized to accept and support a plurality of magnets as described below with respect to FIG. 1B.

For purposes of this application the term "back iron" may refer to iron, an iron alloy, any ferrous compound or alloy, such as stainless steel, any nickel or cobalt alloy, laminated steel, laminated silicon steel, or any laminated metal comprising laminated sheets of such material, or a sintered specialty magnetic powder. In some embodiments, the ring core 504 may be hollow or have passages defined therein to allow for liquid or air cooling.

In certain embodiments, there is a radial gap 212 between the first outer wall 206 and the first side wall 210. The radial gap 212 allows for the passage of a support structure, control wires and electrical conductors (not shown) into the magnetic disc assembly 400 as well as for heat dissipation and/or a thermal control medium. In other embodiments, the gap 212 may be defined within the first outer wall 206 or between the first outer wall 206 and the second outer wall 216. In yet other embodiments, the gap 212 may be located in other locations to optimize performance.

Figure 1B:
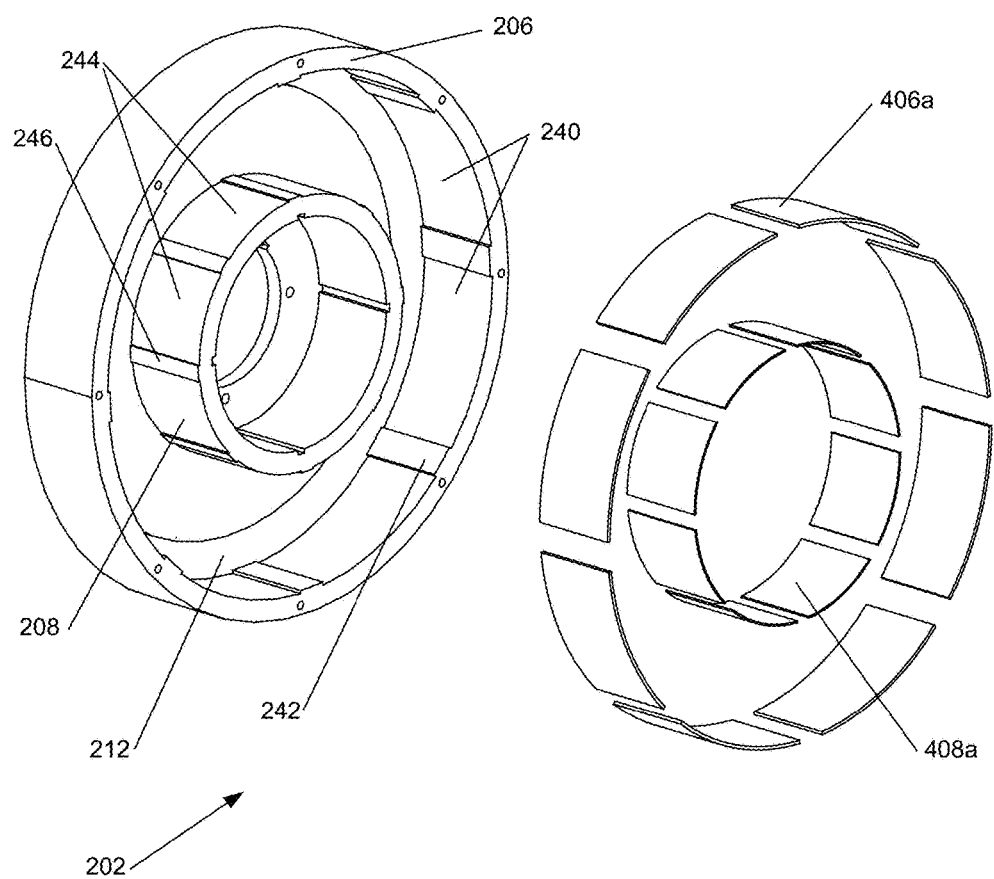
FIG. 1B is a detailed exploded view of certain elements of the motor/generator component of FIG. 1A.

FIG. 1B is a detailed isometric view of the first portion 202 of the back iron circuit illustrating the first inner cylindrical wall 208, positioned within the first outer cylinder wall 206. A plurality of inner longitudinal grooves 240 are defined and radially spaced around an inner surface 242 of the first outer cylinder wall 206. Similarly, a plurality of outer longitudinal grooves 244 are defined and radially spaced around an outer surface 246 of the first inner cylinder wall 208.

As will be described in detail below, a plurality of outer magnets forming a portion of an outer magnetic wall 406a (from the magnetic disc 400 discussed below) are sized to fit within the plurality of inner longitudinal grooves 240. Similarly, a plurality of inner magnets forming a portion of an inner magnetic wall 408a are sized to fit within the plurality of outer longitudinal grooves 244 defined within the outer surface 246 of the first inner cylinder wall 208. Similar or identical grooves or surfaces are found in the second portion 204 of the back iron circuit 200, and thus, will not be separately described in this disclosure.

When the motor/generator element 100 is assembled, the first portion 202 of the back iron circuit 200 and the second portion 204 of the back iron circuit physically support and surround the magnetic disc 400. The first inner wall 208 and second inner wall 218 also radially surrounds and is radially coupled to the rotor hub 300. In certain embodiments, the rotor hub 300 positions and structurally supports certain components of the back iron circuit 200 (which in turn, supports the magnetic components of the magnetic disc 400).

Magnetic Disc Assembly

Figure 2:
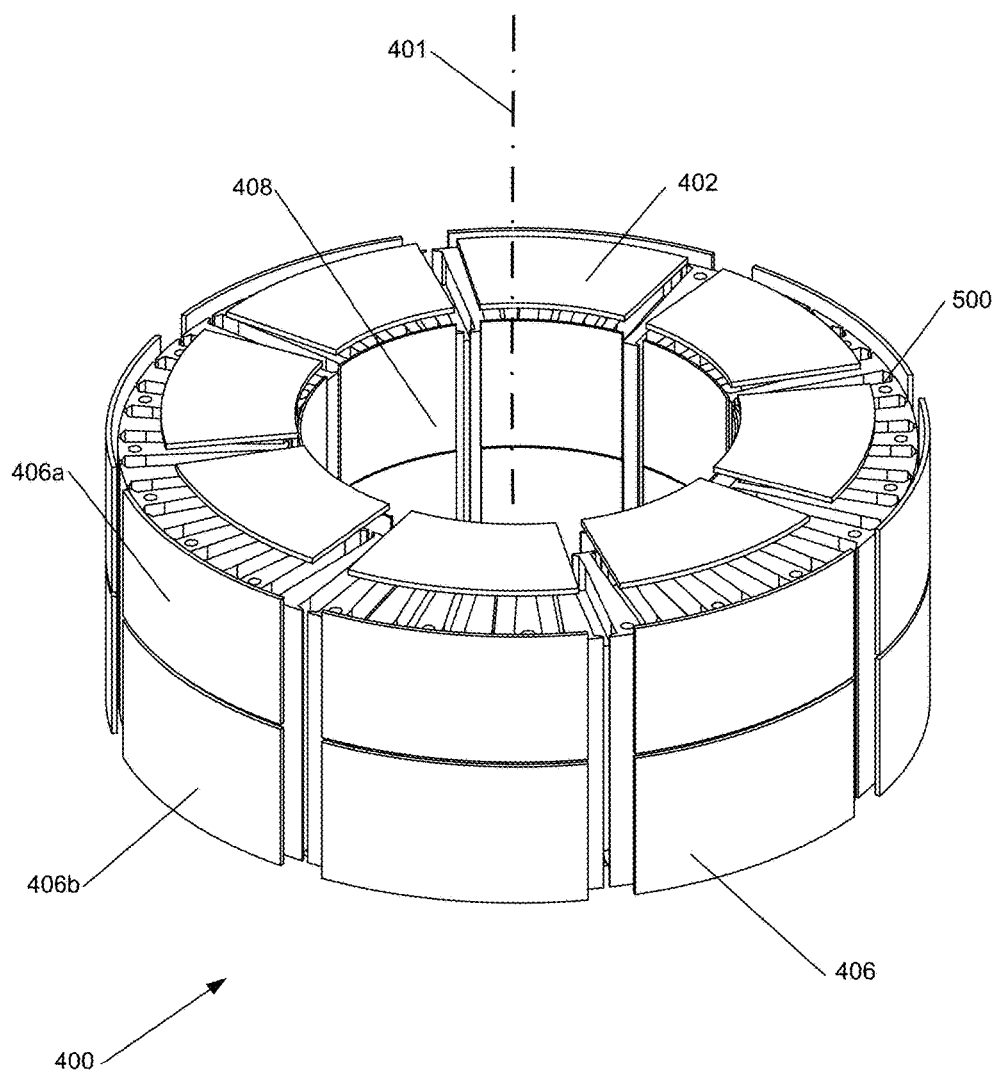
FIG. 2 is a detailed isometric view of a magnetic cylinder/stator element or magnetic cylinder/rotor element of the motor/generator component illustrated in FIG. 1A.
Figure 3:
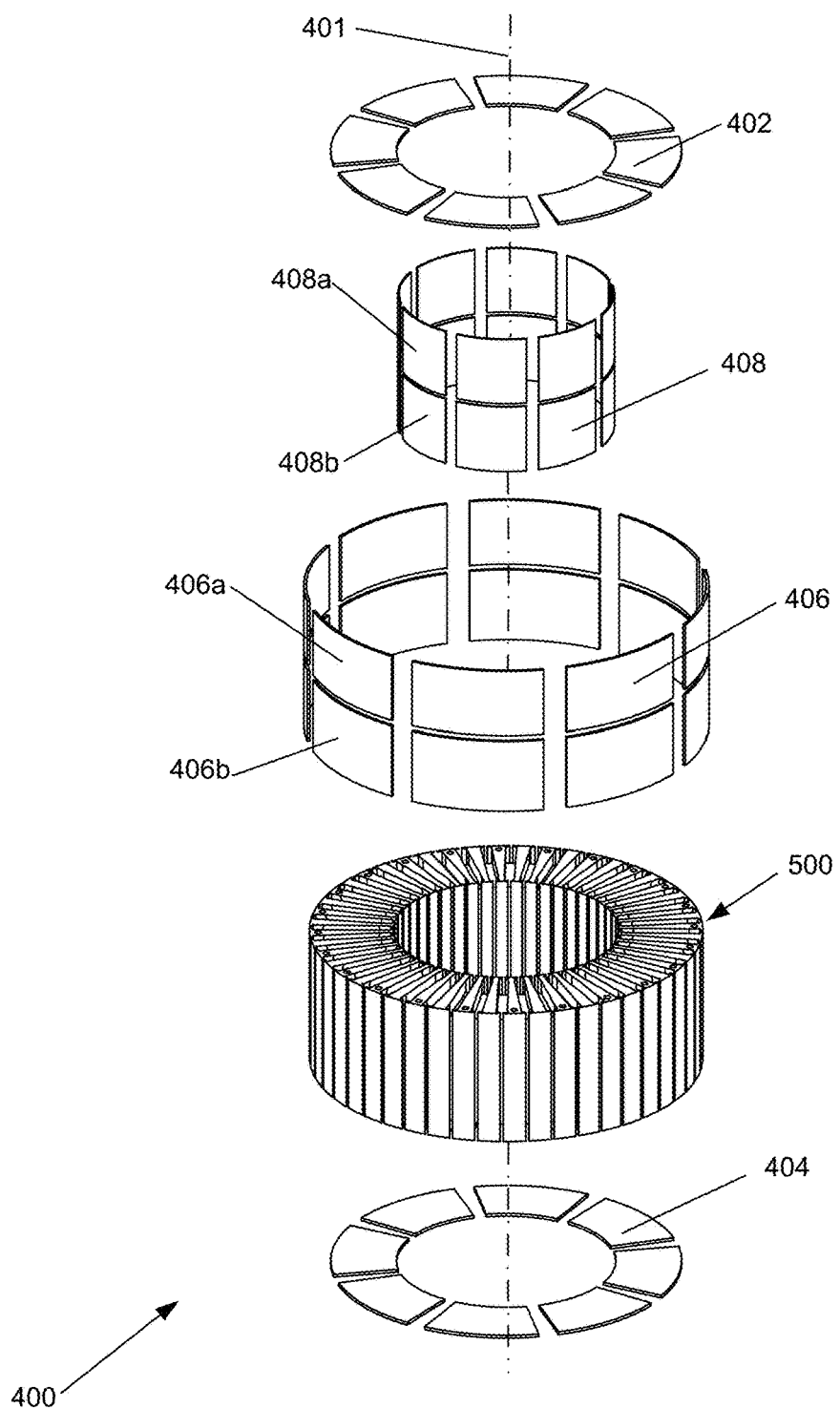
FIG. 3 is an exploded view of the magnetic cylinder/stator element or the magnetic cylinder/rotor element of FIG. 2.

FIG. 2 is a detailed isometric view of the assembled magnetic disc 400 of FIG. 1. FIG. 3 is an exploded view of the magnetic disc 400. In the embodiment illustrated in FIGS. 2 and 3, with respect to a longitudinal axis 401, there is a top or first axial or side wall of magnets 402. Similarly there is a bottom or second axial or side wall of magnets 404. An outer cylindrical wall of magnets 406 is longitudinally positioned between the first axial or side wall 402 and the second axial or side wall of magnets 404. In certain embodiments, the outer cylindrical wall of magnets 406 comprises two pluralities of magnets 406a and 406b which are sized to couple with the back iron walls 206 and 216, as described above with respect to FIG. 1B.

An inner cylindrical wall of magnets 408 is also longitudinally positioned between the first axial or side wall 402 and the second axial or side wall of magnets 404 and concentrically positioned within the outer cylindrical wall of magnets 406. In certain embodiments, the inner cylindrical wall of magnets 408 comprises two pluralities of magnets 408a and 408b which are sized to couple with the back iron walls 208 and 218, as described above in reference to FIG. 1B.

In certain embodiments, the magnets forming the axial side walls 402-404 and cylindrical walls 408-406 discussed herein may be made of out any suitable magnetic material, such as: neodymium, Alnico alloys, ceramic permanent magnets, or electromagnets. The exact number of magnets or electromagnets will be dependent on the required magnetic field strength or mechanical configuration. The illustrated embodiment is only one way of arranging the magnets, based on certain commercially available magnets. Other arrangements are possible, especially if magnets are manufactured for this specific purpose.

Coil Assembly

When the motor/generator 100 is assembled, a coil assembly 500 is concentrically positioned between the outer cylinder wall 406 and the inner cylinder wall 408. The coil assembly 500 is also longitudinally positioned between the first axial side wall 402 and the second axial side wall 404. In certain embodiments, the coil assembly 500 may be a stator. In yet other embodiments, the coil assembly 500 may be a rotor.

Figure 4A:
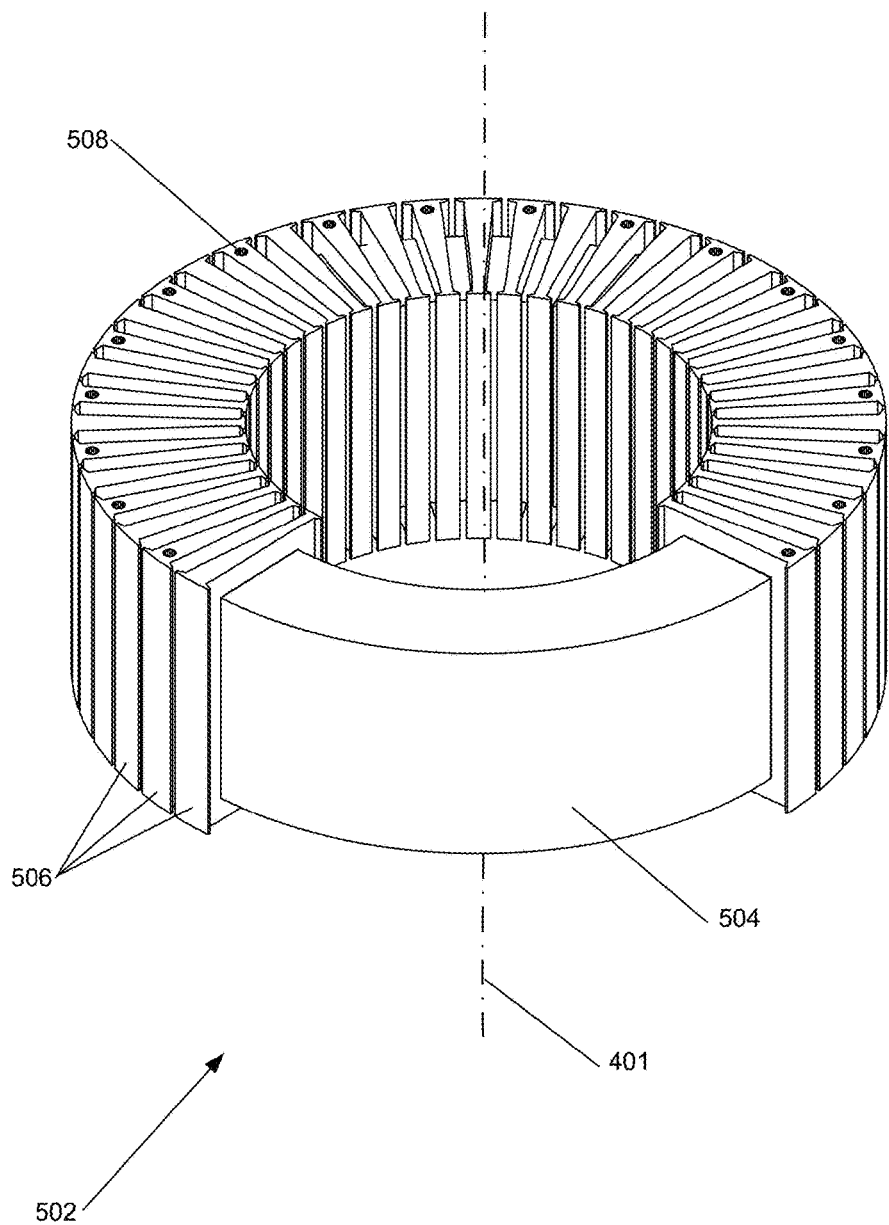
FIG. 4A is an isometric view of a partial coil assembly element.

Turning now to FIG. 4A, there is an isometric view of a coil assembly support 502, which in one embodiment, may be a portion of a stator used in conjunction with a rotor formed by the magnetic axial walls 402-404 and magnetic longitudinal walls 406-408 and the back iron circuit portions 202 and 204 discussed above in reference to FIGS. 1A through 3. In certain embodiments, the coil assembly support 502 comprises a cylindrical or ring core 504 coupled to a plurality of teeth 506 radially spaced about the ring core. FIG. 4A shows a portion of teeth 506 removed so that the ring core 504 is visible.

In certain embodiments, the ring core 504 and coil assembly support 502 may be made out of iron or back iron materials so that it will act as a magnetic flux force concentrator. Some back iron materials are listed above. However, other core materials maybe used when design considerations such as mechanical strength, reduction of eddy currents, cooling channels, etc. are considered.

In yet other embodiments, the coil assembly support 502 may be made from a composite material which would allow it to be sculptured to allow for cooling and wiring from inside. The composite material may be formed of a "soft magnetic" material (one which will produce a magnetic field when current is applied to adjoining coils). Soft magnetic materials are those materials which are easily magnetized or demagnetized. Examples of soft magnetic materials are iron and low-carbon steels, iron-silicon alloys, iron-aluminum-silicon alloys, nickel-iron alloys, iron-cobalt alloys, ferrites, and amorphous alloys.

In certain embodiments, a wiring connection (not shown) can also be formed in the shape of a "plug" for coupling to the stator teeth. Thus, certain teeth of the plurality of teeth 506 may have holes 508 for such plugs (or wires) defined on one side for attachment to a structural support in embodiments where the coil assembly 500 acts as a stator as described below in reference to FIGS. 9A-11.

Figure 4B:
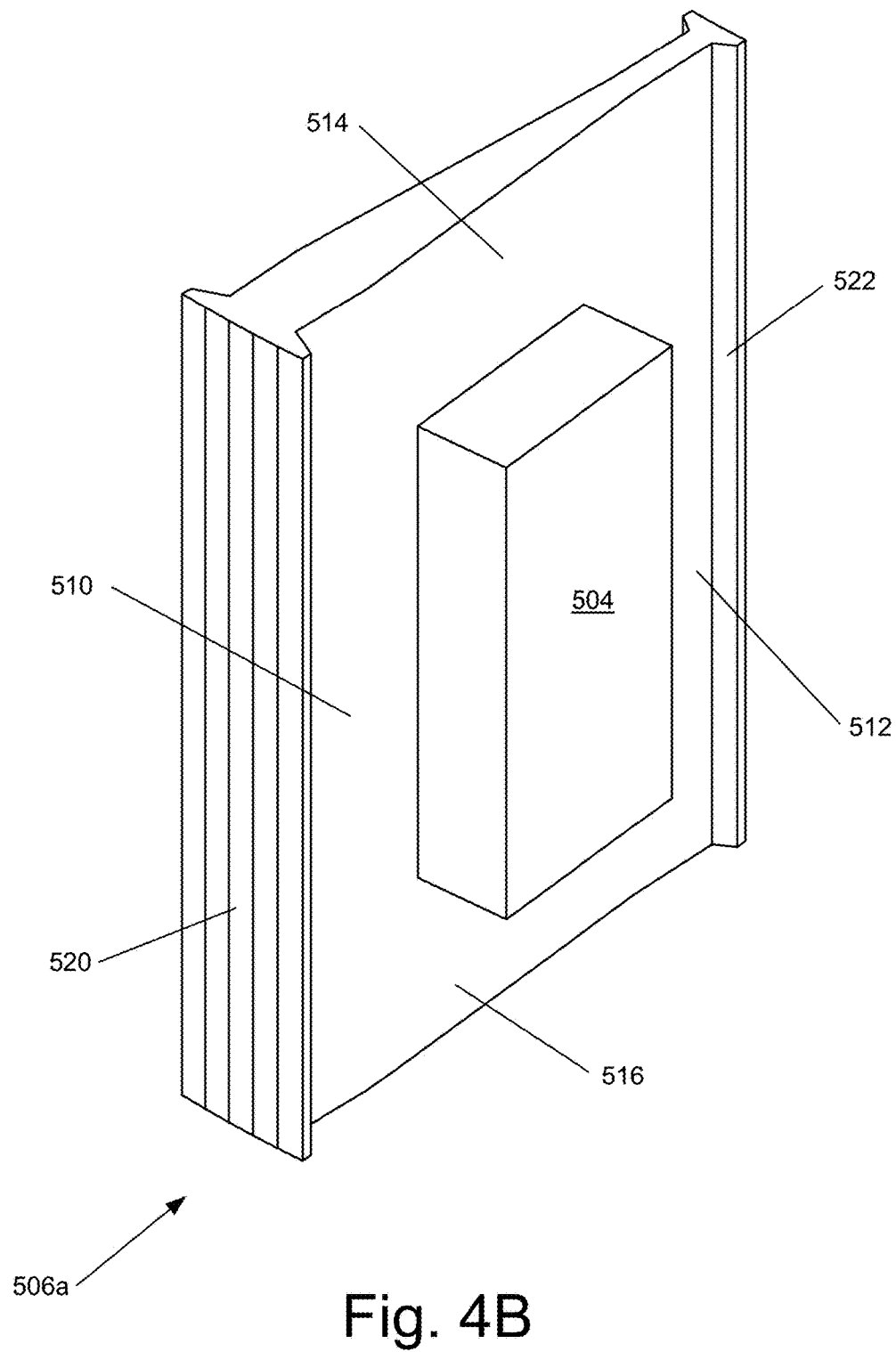
FIG. 4B is a detailed perspective view of a single tooth element of the partial coil assembly element illustrated in FIG. 4A.

One embodiment of an individual tooth 506a and a small portion of the ring core 504 are illustrated in FIG. 4B. The tooth 506a may be made from a material similar to the material forming the core 504, for example, iron, a composite magnetic material, or laminated steel. In the illustrated embodiment, each tooth 506a extends from the ring core 504 in radial and vertical (or longitudinal) directions. Thus, each tooth 506a comprises an outer radial portion 510 extending radially away from the longitudinal axis 401 (see FIG. 4A), an inner radial portion 512 extending radially toward the longitudinal axis 401, a top vertical or longitudinal portion 514 extending in one vertical or longitudinal direction, and a bottom vertical or longitudinal portion 516 extending in the opposing longitudinal direction. The ring core 504 supports the individual tooth 506a as well as other teeth as described above in reference to FIG. 4A.

In certain embodiments, an exterior fin 520 couples to an exterior portion of the outer radial portion 510 and extends outward from the outer radial portion 510 in both circumferential or tangential directions with respect to the longitudinal axis 401. Similarly, an interior fin 522 couples to an interior portion of the inner radial portion 512 and extends outward from the inner radial portion 512 in both tangential directions.

Figure 4C:
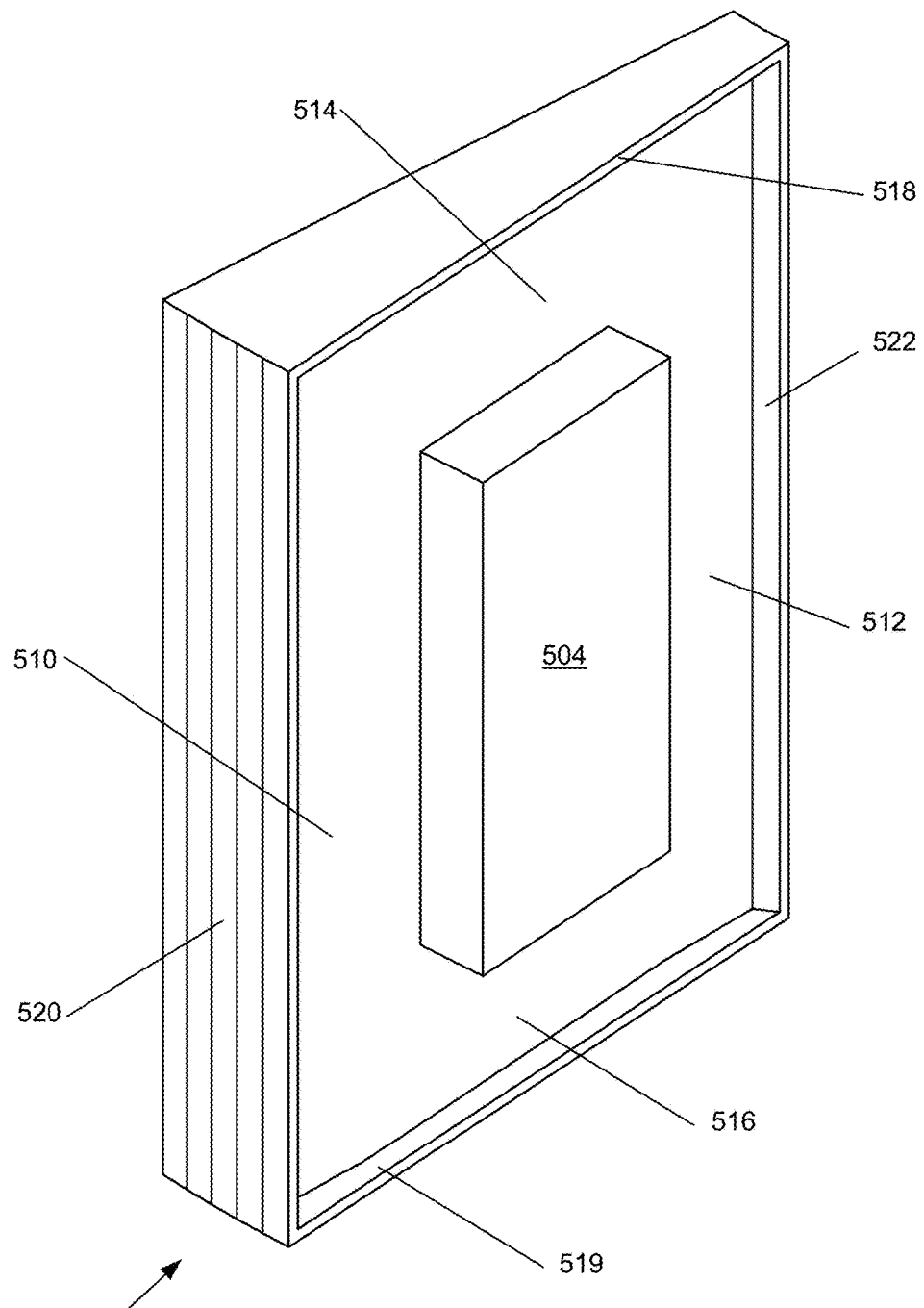
FIG. 4C is a detailed perspective view of an alternative embodiment of a single tooth element of the partial coil assembly element illustrated in FIG. 4A.

An alternative embodiment of an individual tooth 506a' and a small portion of the ring core 504 are illustrated in FIG. 4C. The tooth 506a' is similar to the tooth 506a described above in reference to FIG. 4B except that the tooth 506a' also has radial or horizontal fins extending from the top vertical portion 514 and the lower vertical portion 516. Specifically, a top radial fin 518 extends in both horizontal circumferential (or tangential) directions from the top horizontal portion 514 and connects the exterior fin 520 to the interior fin 522. Similarly, a bottom radial fin 519 extends in both horizontal circumferential or tangential directions from the bottom vertical portion 516 and connects the exterior fin 520 to the interior fin 522 as illustrated in FIG. 4C.

Figure 4D:
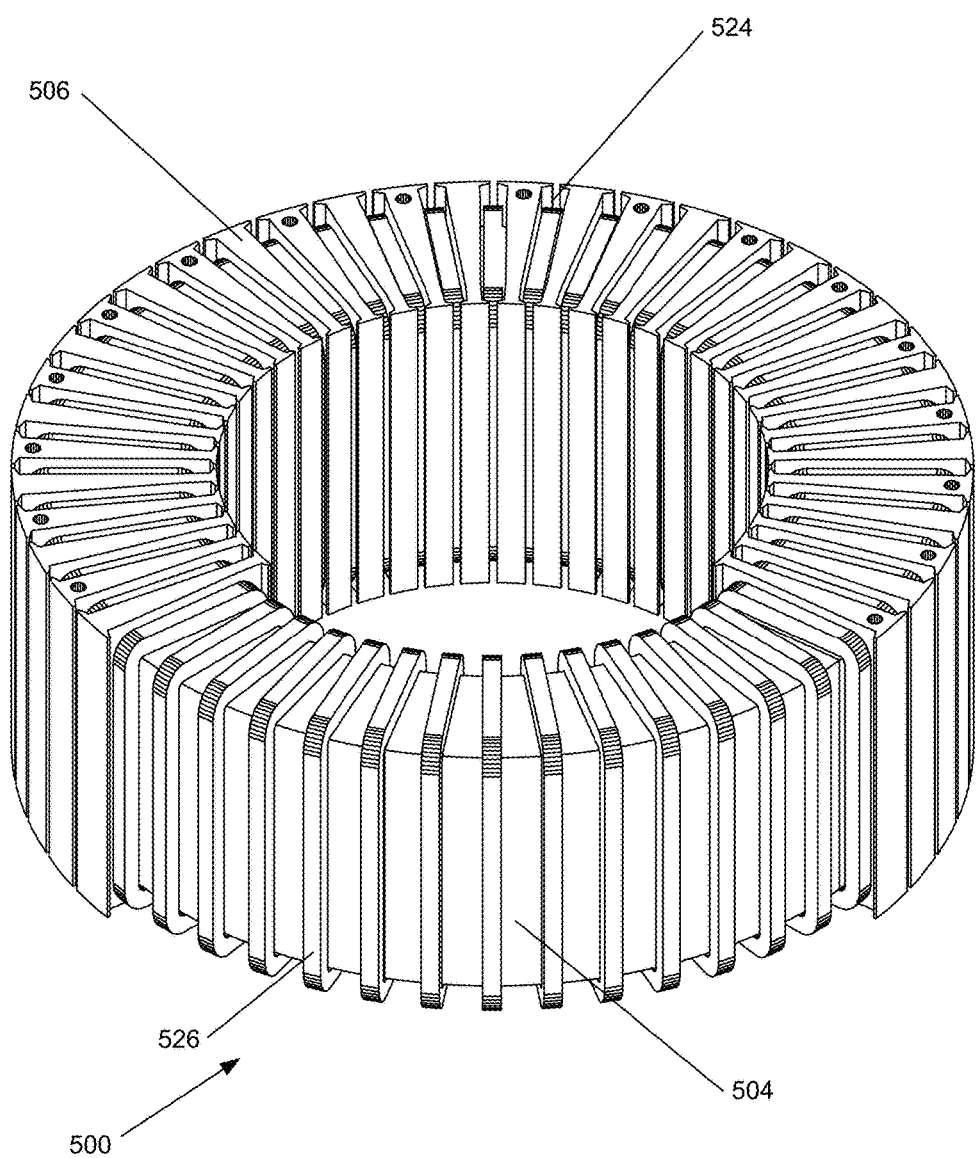
FIG. 4D is an isometric view of the partial coil assembly element of FIG. 4A coupled to a plurality of coil windings.
Figure 4E:
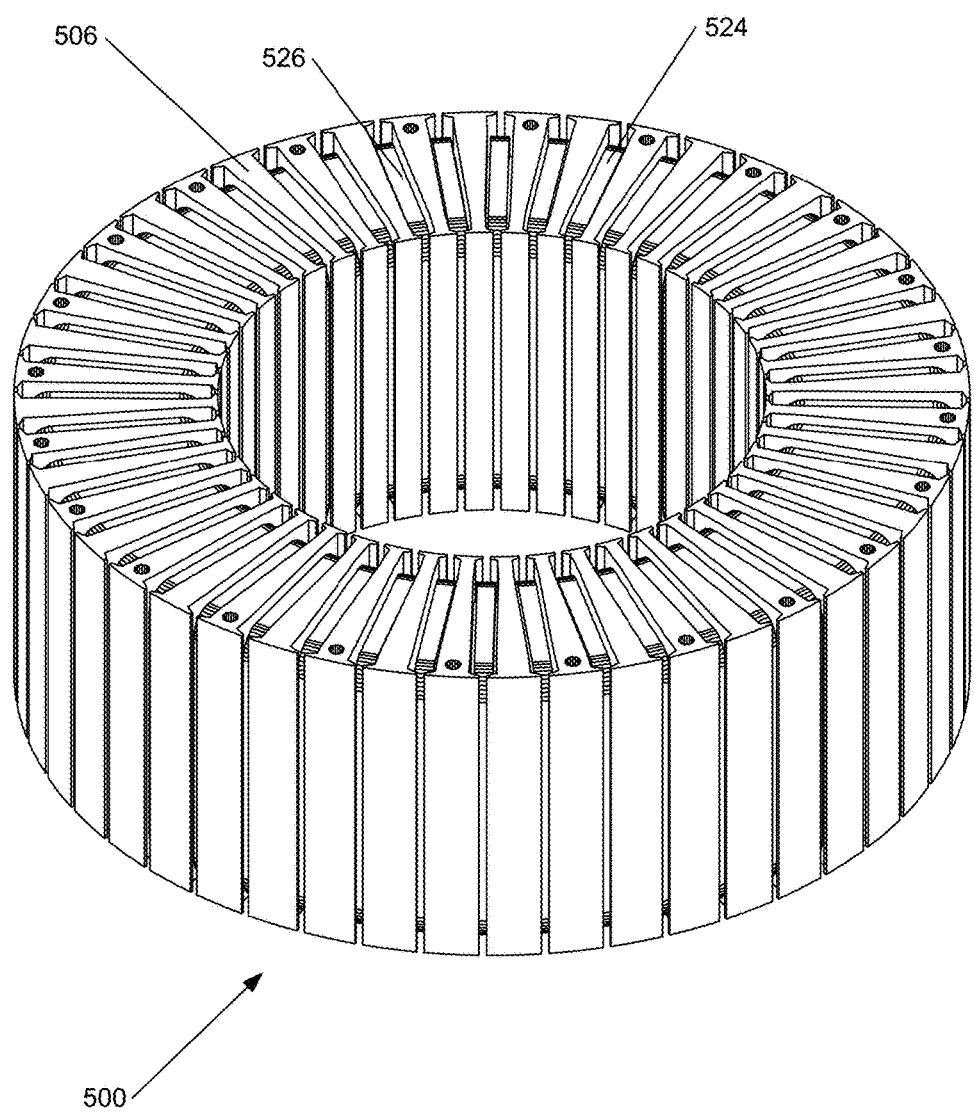
FIG. 4E is an isometric view of a coil assembly.

Adjacent teeth 506 (or adjacent teeth 506a') supported by the core ring 504 form radial slots 524 within the coil assembly support structure 502, as illustrated in FIG. 4A. A plurality of coils or coil windings 526 may be positioned radially about the ring core 504 and within the slots 524 as illustrated in FIG. 4D. FIG. 4D illustrates the plurality of coil windings 526 distributed about the ring core 504 with a number of teeth 506 removed for clarity. In contrast, FIG. 4E illustrates a complete coil assembly 500 showing all of the teeth 506 and coil windings 526 positioned within the slots 524.

Coils or Coil Windings

Each individual coil 526 in the coil assembly 500 may be made from a conductive material, such as copper (or a similar alloy) wire and may be constructed using conventional winding techniques known in the art. In certain embodiments, concentrated windings may be used. In certain embodiments, the individual coils 526 may be essentially cylindrical or rectangular in shape being wound around the ring core 504 having a center opening sized to allow the individual coil 526 to surround and be secured to the ring core 504. Thus, in such embodiments, the winding does not overlap.

By positioning the individual coils 526 within the slots 524 defined by the teeth 506, the coils are surrounded by the more substantial heat sink capabilities of the teeth which, in certain embodiments, can incorporate cooling passages directly into the material forming the teeth. This allows much higher current densities than conventional motor geometries. Additionally, positioning the plurality of coils 526 within the slots 524 and between teeth 506 reduces the air gap between the coils. By reducing the air gap, the coil assembly 500 can contribute to the overall torque produced by the motor or generator.

In certain embodiments, the horizontal fins 518 and 519, the circumferential fins 520 and 522 of the teeth 506a or 506a' of the coil assembly reduce the air gaps between the magnetic material and the coil structure to allow flux forces to flow in the proper direction when the coils are energized and the coil assembly 500 begins to move relative to the magnetic tunnel. Thus, all portions of the coil support assembly 502 contribute to the overall torque developed by the system. In yet other embodiments, the teeth 506 may not have any fins. Although the fins create a more efficient design, the fins complicate the fabrication of the coil windings, thereby increasing the motor costs. Unconventional winding techniques may be used when using fins—such as fabricating the coil assembly support 502 in conjunction with the coil windings. In some embodiments, a winding may be started at the center of the conductor length with two bobbins rotating in opposite directions around the core with the wound segments in separate parallel planes. This method has the advantage of both conductor ends exiting at the same location and eliminating compression of one conductor length exiting from the center of the winding.

The number of individual coils 526 can be any number that will physically fit within the desired volume and of a conductor length and size that produces the desired electrical or mechanical output as known in the art. In yet other embodiments, the coils 526 may be essentially one continuous coil, similar to a Gramme Ring as is known in the art.

The windings of each coil 526 are generally configured such that they remain transverse or perpendicular to the direction of the relative movement of the magnets (e.g. the rotor) comprising the coil assembly 500 and parallel with the longitudinal axis 401. In other words, the coil windings are positioned such that their sides are parallel with the longitudinal axis 401 and their ends are radially perpendicular to the longitudinal axis. As will be explained below, the coil windings are also transverse with respect to the magnetic flux produced by the individual magnets of the rotor at their interior face as described below in reference to FIG. 7A to 7C. Consequently, the entire coil winding or windings may be used to generate movement (in motor mode) or voltage (in generator mode).

In sum, the windings are placed in an axial/radial direction in multiple slots 524 (e.g. 48 slots) which can form a single phase or multi-phase winding. The radial/axial placement of the windings may create a maximum force in the direction of motion for all four sides of the windings.

The Magnetic Cylinder

Figure 5:
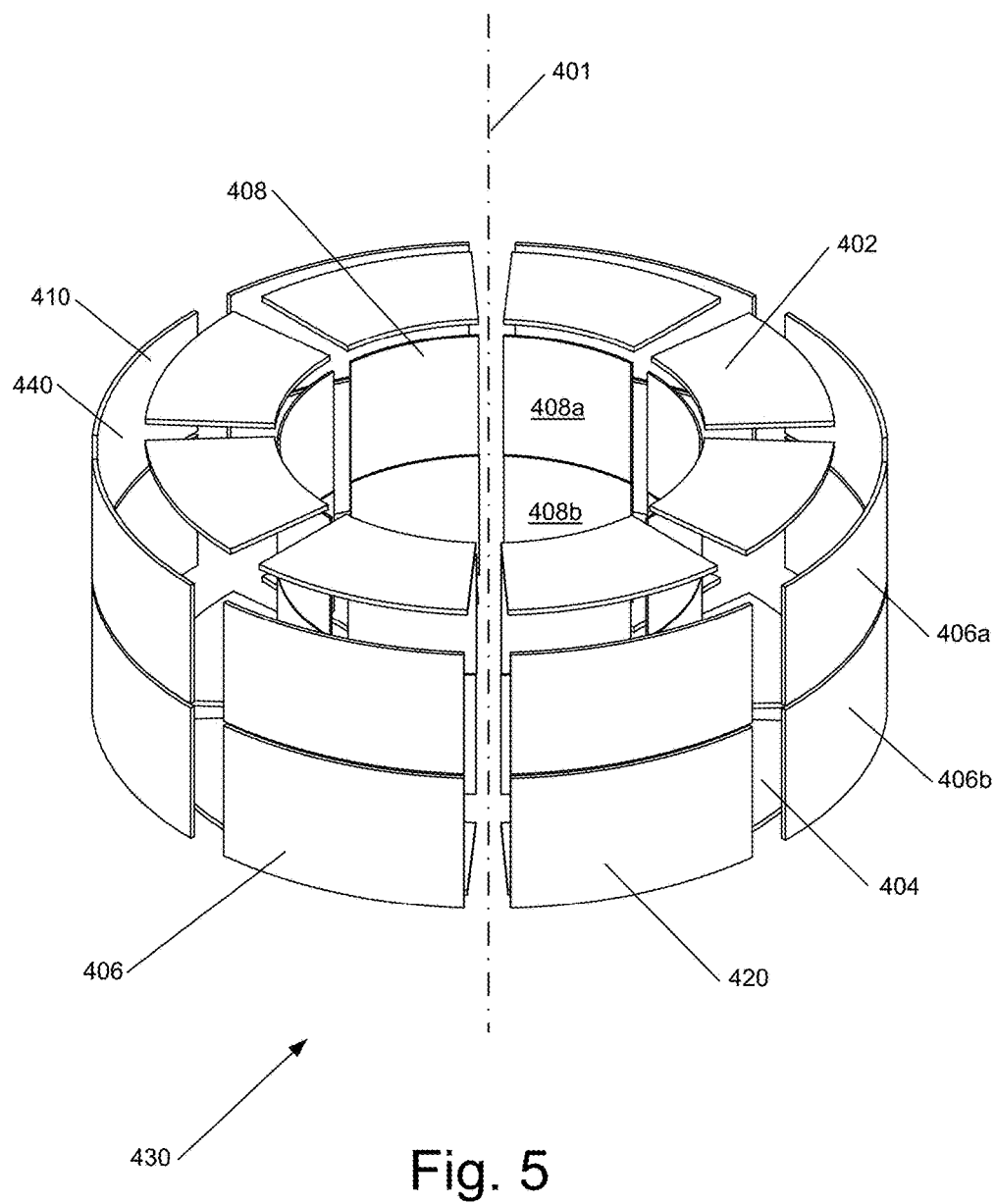
FIG. 5 illustrates one embodiment of a toroidal magnetic cylinder.

FIG. 5 is an isometric view of the magnetic disc assembly 400 with the coil assembly 500 removed for clarity. The magnets of the magnetic disc assembly 400 form a toroidal magnetic cylinder 430 defining a toroidal magnetic tunnel 440 positioned about the longitudinal axis 401. As described previously, the toroidal magnetic cylinder 430 includes: the top axial or side wall of magnets 402, the bottom or second axial or side wall of magnets 404, the outer cylindrical wall 406 of magnets positioned longitudinally between the first side wall 402 of magnets and the second side wall 404 of magnets; and the inner cylindrical wall 408 of magnets positioned concentrically within the outer cylindrical wall 406 of magnets. In certain embodiments, the outer cylindrical wall 406 may be formed by two pluralities of magnets 406a and 406b, where each plurality of magnets are sized to couple with the back iron circuit walls 206 and 216, respectively. Similarly, the inner cylindrical wall 408 may be formed by two pluralities of magnets 408a and 408b, where each plurality of magnets are sized to couple with the back iron circuit walls 208 and 218, respectively.

As discussed above with respect to the back iron circuit 200, depending on the embodiment, there may be a radial circumferential slot 410 defined by the outer longitudinal ring of magnets 406 and one of the side walls 402 or 404 to accommodate a support structure for the stator and/or control wires, conductors, ventilation and/or a cooling medium. In other embodiments, there may be a circumferential slot separating the outer cylinder wall 406 of magnets into a first longitudinal ring 406a and a second longitudinal ring 406b of magnets. In yet other embodiments, there may be a circumferential slot separating the inner cylinder wall 408 of magnets into a first longitudinal ring 408a and a second longitudinal ring 408b of magnets. In yet further embodiments, a circular slot may be defined anywhere within the side walls 402 or 404.

In the embodiment illustrated in FIG. 5, the magnetic side walls 402, 404 and the magnetic cylindrical walls 406 and 408 may be made from commercially available magnetic segments. In other embodiments, plate magnets may be customized for a particular application. The number of segments forming the rings or walls will depend on the particular design and performance characteristics for a particular application.

Note that in the illustrative embodiment of FIG. 5, there are eight radial "slices" or magnetic segments 420 forming a complete toroidal magnetic cylinder 430. However, the exact number of segments depends on the size, performance characteristics, and other design factors.

Figure 6:
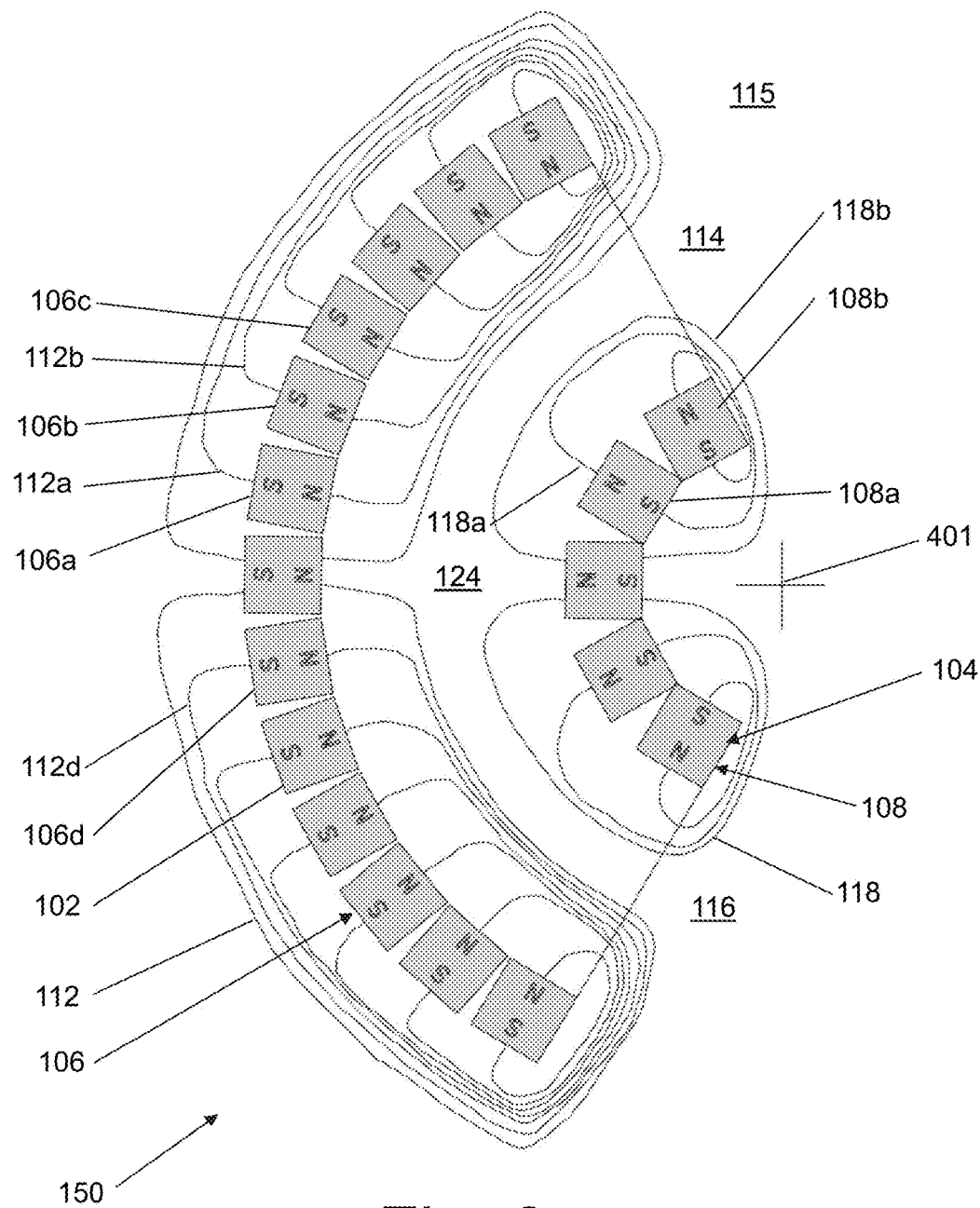
FIG. 6 illustrates a conceptual two-dimensional radial segment of a toroidal magnetic cylinder.

FIG. 6 is a cross-sectional conceptual view of one embodiment of a radial "slice" 150 of a magnetic cylinder which is conceptually similar to the radial segment 420 of the toroidal magnetic cylinder 430 of FIG. 5 above. In certain embodiments, the partial magnetic cylinder 150 comprises an outer curved wall 102 and an inner curved wall 104. The outer curved wall 102 and inner curved wall 104 may be made with a plurality of magnets. In a lateral section view, such as illustrated in FIG. 6, it can be seen that the outer curved wall 102 is comprised of a plurality of magnets 106, comprising individual magnets, such as magnets 106a, 106b, 106c, etc. Similarly, the inner curved wall 104 may be comprised with a plurality of magnets 108, comprising individual magnets 108a, 108b, etc. It should be noted that only one polarity of the magnets are utilized within (or facing into) the magnetic cylinder portion 150. For instance in the illustrative embodiment of FIG. 6, the north poles of the magnets 106 are each pointing radially towards the center or longitudinal axis 401 (which is coming out of the page in FIG. 6). On the other hand, the north poles of the magnets 108 each point radially away from the longitudinal axis 401 and towards an interior cavity or tunnel 124 of the partial magnetic cylinder 150.

In certain embodiments, there may be a central core, such as an iron core (not shown in FIG. 6), where a portion of the core is positioned within the interior tunnel 124 between the outer wall 102 and the inner wall 104. In certain embodiments, the core may be used as a magnetic flux line concentrator.

When the plurality of magnets 106 and 108 are arranged into the outer wall 102 and inner wall 104 to form a partial cylinder 150, the density of the magnetic flux forces will form particular patterns as represented in a conceptual manner by the flux lines 112 illustrated in FIG. 6. The actual shape, direction, and orientation of the flux lines 112 depend on factors such as the use of an interior retaining ring, a center core, a back iron circuit, material composition and/or configuration.

To generally illustrate this magnetic arrangement, the flux line 112a (or flux lines) from the magnet 106a of the exterior wall 102 tends to flow from the north pole (interior face) of the magnet in a perpendicular manner from the face of the magnet into and through the interior tunnel 124 of the partial cylinder 150, exiting through the open end 114 into the open area 115, then flow around the exterior of the partial cylinder 150, and back to an exterior face of the magnet 106a containing its south pole.

Similarly, the flux line 112b from the magnet 106b of the exterior wall 102 tends to flow from the north pole of the magnet in a perpendicular manner from the face of the magnet into and through the interior tunnel 124 of the partial cylinder 150, exiting through the open end 114 into the open space 115, then flow around the exterior of the cylinder 150, and back to the face of the magnet 106b containing its south pole. Although only a few flux lines 112 are illustrated for purposes of clarity, each successive magnet in the "top portion" of the plurality of magnets will produce similar flux lines. Thus, the magnetic flux forces for each successive magnet in the plurality of magnets 106 tend to follow these illustrative flux lines or patterns for each successive magnetic disc in the plurality of magnets 106 until the magnets at the open ends 114 or 116 of the partial magnetic cylinder 150 are reached.

As illustrated, the magnet 106a is positioned circumferentially adjacent to the magnet 106b. In turn, another magnet 106c is positioned circumferentially adjacent to the magnet 106b. Additional magnets in the group 106 may be positioned circumferentially adjacent to others until the open end 114 is reached. The flux lines 112 generated from the adjacent magnetic poles in the magnetic group 106 are concentrated at the open ends of the tunnel segment where they turn back towards an exterior face of the respective magnet.

Magnets in the "bottom portion" of the plurality of magnets 106, such as magnet 106d tend to generate flux lines 112d from the magnet 106d on the exterior wall 102 which tends to flow from the north pole (interior face) of the magnet in a perpendicular manner from the face into and through the interior tunnel 124 of the partial cylinder 150, exiting through an open end 116 into the open space, then flow around the exterior of the partial cylinder 150, and back to an exterior face of the magnet 106d containing its south pole. Although only a few flux lines on the opposing side of the partial cylinder 150 are illustrated for purposes of clarity, each successive or magnet in the plurality of magnets will produce similar flux lines which will also be concentrated at the opening 116 as described above. In embodiments with an iron core, the flux lines will generally flow in a similar manner, but will tend to flow through the core and be concentrated within the core. Thus, in certain embodiments, the core may act as a flux concentrator.

The interior magnetic wall 104 also produces flux forces, which also may be illustrated by flux lines, such as exemplary flux lines 118. For instance, the flux line 118a from the magnet 108a on the interior wall 104 tends to flow from interior face (e.g., the north pole) in a perpendicular manner from the face of the magnet, into and through the interior tunnel 124 of the partial cylinder 150, out the open end 114 (or open end 116) and into the open space 115, then around the interior wall 104 to the face of the magnet 108a containing its south pole.

The magnetic flux forces for each successive magnet in the plurality of magnets 108 tend to follow these illustrative flux lines or patterns 118 for each successive magnet in the plurality of magnets 108 until the open ends 114 or 116 of the partial magnetic cylinder 150 are reached. Thus, the flux forces produced by the magnets of the interior wall 104 of the partial cylinder 150 have an unobstructed path to exit through one of the open ends of the partial cylinder and return to its opposing pole on the exterior or interior of the cylinder.

As discussed above, the magnetic flux lines 112 and 118 will tend to develop a concentrating effect and the configuration of the exterior magnetic cylinder manipulates the flux lines 112 and 118 of the magnets in the partial magnetic cylinder 150 such that most or all of the flux lines 112 and 118 flow out of the open ends 114 and 116 of the partial cylinder. In conventional configurations, the opposing poles of the magnets are usually aligned longitudinally. Thus, the magnetic flux lines will "hug" or closely follow the surface of the magnets. So, when using conventional power generating/utilization equipment, the clearances must usually be extremely tight in order to be able to act on these lines of force. By aligning like magnetic poles (e.g. all south or all north) radially with respect to the longitudinal axis 401, the magnetic flux lines 112 and 118 tend to radiate perpendicularly from the surface of the magnets. This configuration allows for greater tolerances between coils and the partial magnetic cylinder 150.

The partial magnetic cylinder 150 is a simplified two dimensional section illustration of a three dimensional magnetic arrangement concept. The three dimensional arrangement also has magnetic top and bottom magnetic walls with their north magnetic poles facing the interior of the tunnel 124 (not shown). Additionally, similar results can be obtained by replacing the plurality of magnets 106 with a single curved plate magnet magnetized in a similar manner (e.g., a north pole is formed on the interior face and a south pole is formed on an exterior face). Similarly, the plurality of magnets 108 may be replaced with a single curved plate magnet having its north pole on the surface facing the interior tunnel 124 and the south pole on the surface facing towards the longitudinal axis 401.

Figure 7A:
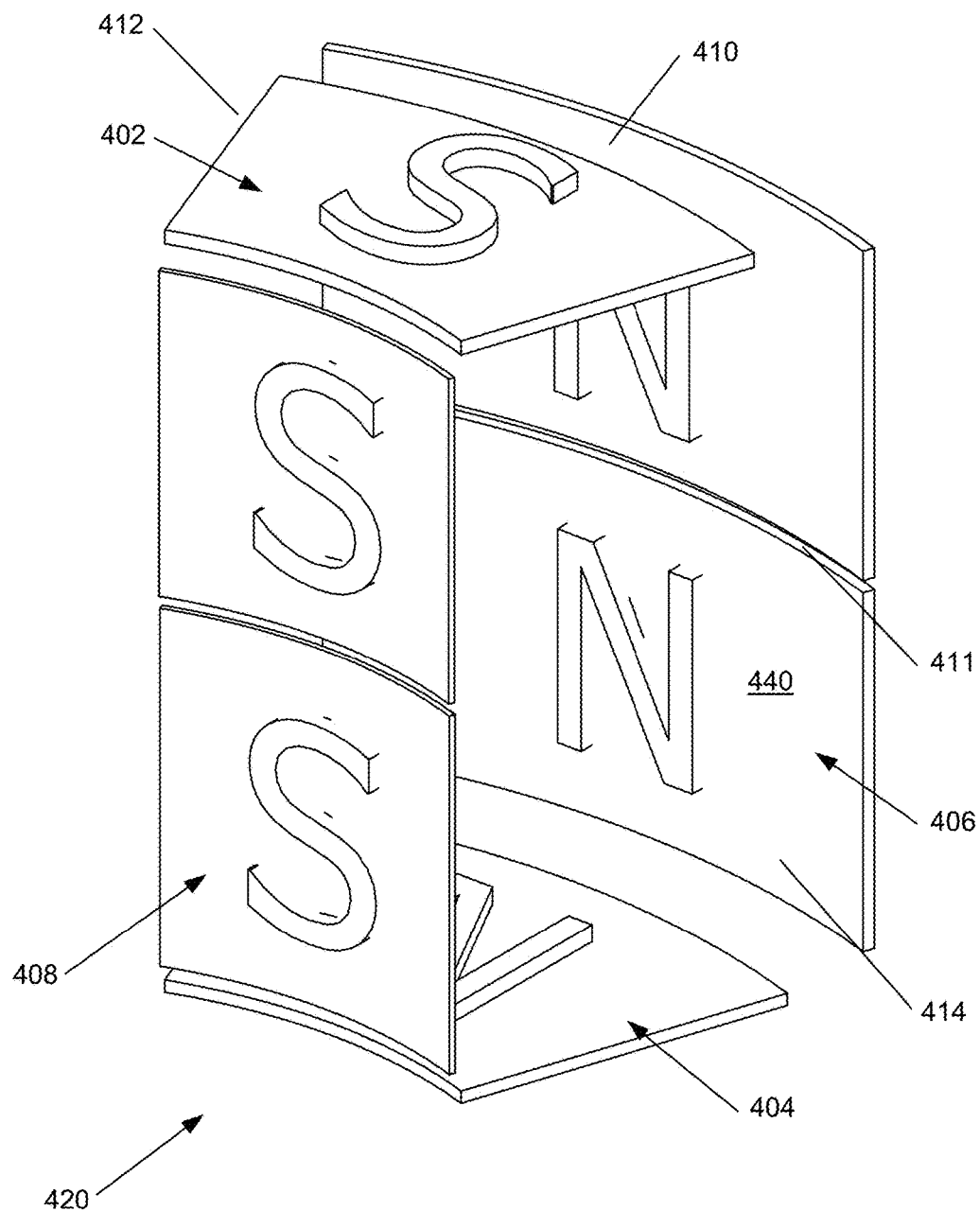
FIG. 7A is a detailed isometric view of one embodiment of a radial portion or radial segment of the toroidal magnetic cylinder illustrated in FIG. 5.

For instance, FIG. 7A is a detailed perspective view of the radial segment 420 of the toroidal magnetic cylinder 430 (see FIG. 5) defining a portion of the magnetic tunnel 440 as discussed above in reference to FIG. 5. The radial segment 420 is conceptually similar to the partial magnetic cylinder 150 because the radial segment 420 has an outer curved magnetic wall 406 and an inner curved magnetic wall 408. In addition to the curved or cylindrical magnetic walls 406 and 408, there are also magnetic axial or lateral walls 402 and 404 which in this illustrated embodiment may be made of wedge shaped plate magnets.

The magnetic poles of the magnets forming the outer cylindrical wall 406 and the inner cylindrical wall 408 have their magnetic poles orientated radially pointing towards the longitudinal axis 401 (see FIG. 5). In contrast, the magnetic poles of the magnets forming the top or first axial wall 402 and the bottom or second axial wall 404 have their magnetic poles orientated or aligned parallel with the longitudinal axis 401. The individual magnets in the magnetic walls 402, 404, 406, and 408 all have their similar or "like" (e.g. north) magnetic poles orientated either towards or away from the interior of the tunnel 440 of the toroidal magnetic cylinder 430 to form a "closed" magnetic tunnel 440. The closed magnetic tunnel 440 runs circumferentially from the open end or exit 412 to the open end or exit 414 (similar to the tunnel 124 and open ends 114 and 116 discussed above with reference to FIG. 6).

For purposes of this disclosure and to illustrate the orientation of magnetic poles at the surfaces of the magnets forming the radial segment 420, the top axial wall 402 is labeled with an "S" on its exterior top face to indicate that in this particular configuration, the south pole of the magnet (or magnets) forming the top axial wall 402 faces away from the tunnel 440. Thus, the north pole of the magnet 402 faces towards the tunnel segment 440. Similarly, the lower axial or side wall 404 is labeled with a "N" on its interior side face to indicate that the north pole of the magnet forming the side wall 404 is facing towards the tunnel segment 440 (however, in this view the "N" is partially obscured). The two magnets forming the outer longitudinal wall 406 are labeled with an "N" on their interior surfaces to indicate that their north magnetic poles face the interior of the magnetic tunnel 440. In contrast, the two magnets forming the inner longitudinal wall 408 are labeled with an "S" on their exterior surfaces to indicate that their south poles are facing away from the tunnel 440. Thus, their north poles face towards the tunnel 440.

Figure 7B:
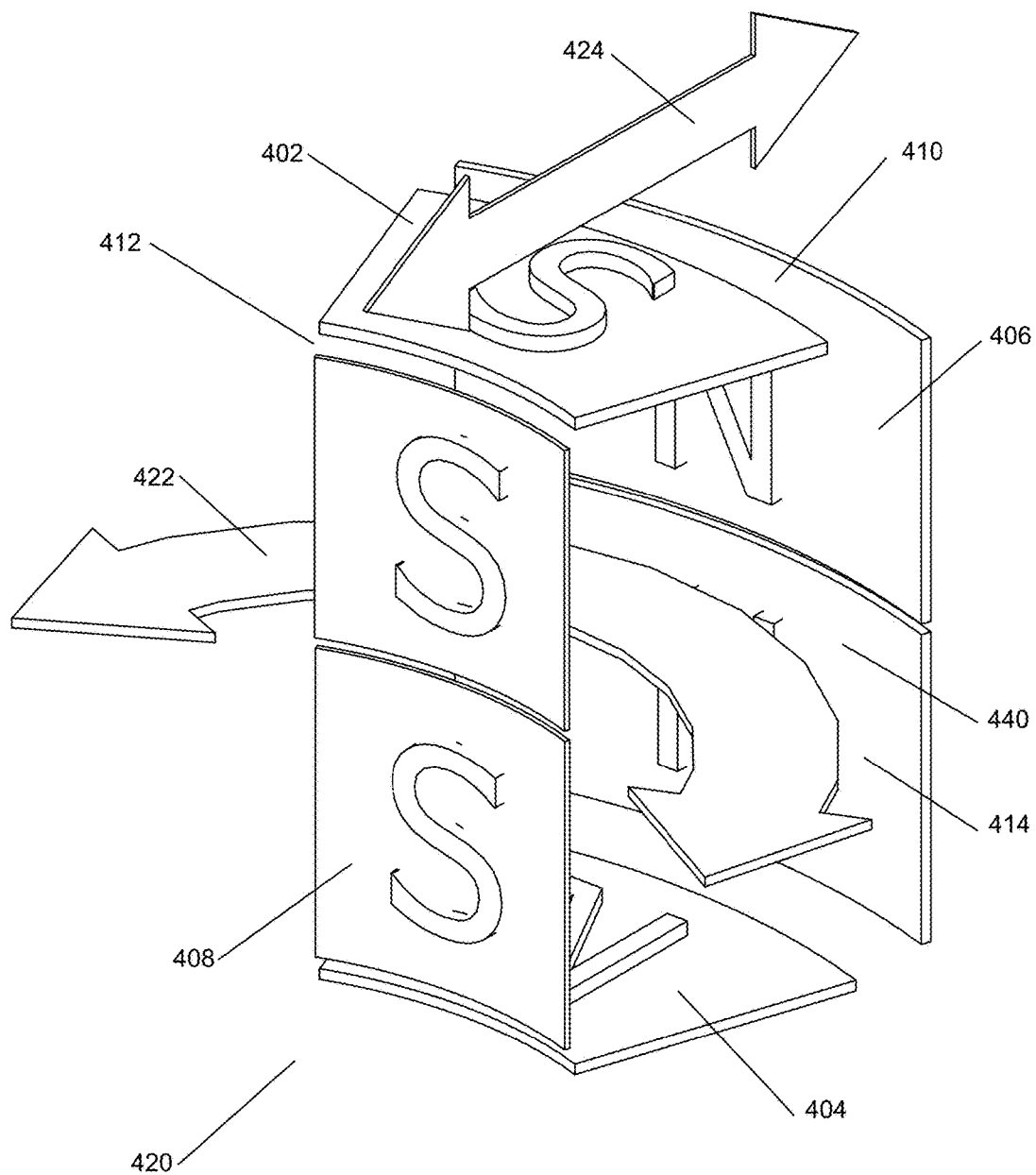
FIG. 7B is a detailed isometric view of one embodiment of the radial portion or radial segment illustrated in FIG. 7A with the addition of direction arrows.

In this illustrative embodiment of the radial segment 420, all the magnets of the walls 402, 404, 406 and 408 have their north poles facing towards the interior or tunnel 440. So, the radial segment 420 has an NNNN magnetic pole configuration. Thus, the magnetic forces which tend to repel each other—forcing the magnetic flux circumferentially along the tunnel 440 in a circumferential direction and out the tunnel exits 412 and 414 similar to that described above in reference to FIG. 6. FIG. 7B is an illustration of the radial segment 420, but with the addition of directional arrows. Arrow 422 illustrates a circumferential direction and the arrow 424 illustrates a radial direction.

The term "closed magnetic tunnel" as used in this disclosure refers to using an arrangement of the magnets forming a tunnel that "forces" or "bends" the majority of the magnetic flux "out of plane" or circumferentially through the tunnel or interior cavity then out through one of the openings 412 or 414 as illustrated by the circumferential arrow 422 of FIG. 7B. In contrast, if the magnetic tunnel were not magnetically "closed," the flux forces would generally flow in a radial manner in the direction of the radial or lateral arrow 424 (or in a plane represented by the arrow 424). Conventional motors usually allow flux forces to flow in a radial direction as illustrated by the arrow 424.

Figure 7C:
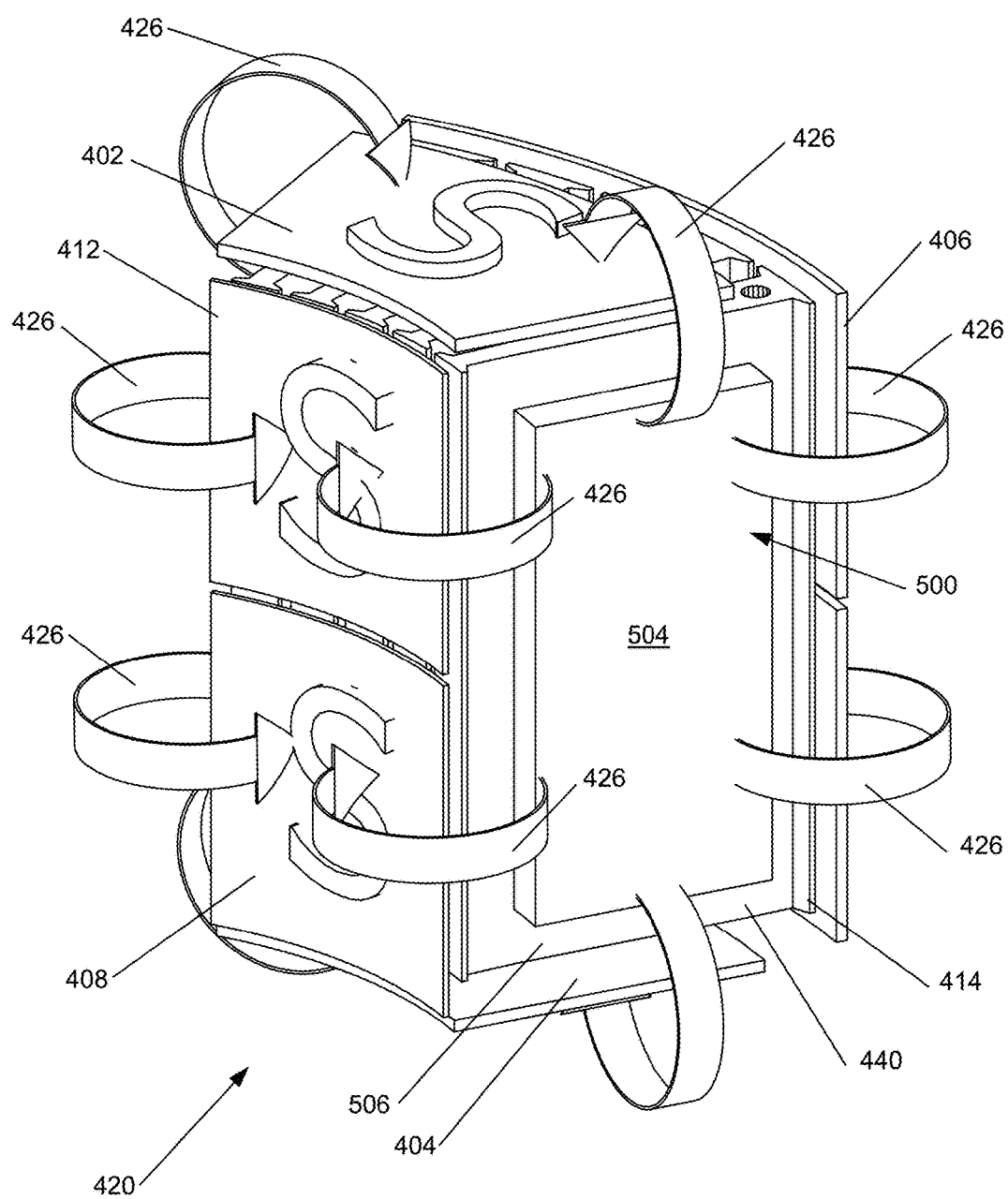
FIG. 7C is a detailed isometric view of one embodiment of the radial portion or radial segment illustrated in FIG. 7A with the addition of a portion of a coil assembly illustrated in FIG. 4E.

Turning now to FIG. 7C, there is illustrated an isometric view of radial segment 420 with a portion of the coil assembly 500 positioned within the interior of the segment or tunnel 440 (FIG. 5B). The rest of the coil assembly 500 has been removed for clarity. In an un-energized state, the magnetic flux tends to flow from the north poles of the magnetic walls 402, 404, 406 and 408 into the coil assembly 500 and to the coil core 504. Because of opposing magnetic forces, the magnetic flux continues to flow circumferentially through the coil core 504 until the flux reaches an opening (for instance, open end 414) of the tunnel 440. The flux then bends back around an open end (e.g. open end 414) of the radial segment 420 to an exterior face of the respective magnetic wall containing a south pole. Arrows 426 of FIG. 7C are meant to illustrate the three dimensional flux path as the flux reaches an open end 412 or 414 of the radial segment and bends back around to an exterior face (or in this case, the south pole) of the appropriate magnetic wall. Thus, the radial segment 420 generates a flux field which is conceptually similar to the flux fields 112 and 118 discussed above in reference to FIG. 6 (In situations where a radial segment 420 is adjacent to another radial segment of an opposite magnetic polarity configuration, the flux lines could extend into the adjacent partial toroidal magnetic cylinder).

In certain embodiments, the core 504/coil assembly 500 may generate its own magnetic field fluxes as current is introduced into the supporting coils 526 (FIG. 4D). The majority of magnetic field fluxes are also constrained and channeled to interact with the magnetic flux generated from the magnetic tunnel (e.g., from permanent magnets) in a similar manner to that described above. Thus, all portions of the coil 504/coil assembly 500 may interact with the flux lines of the magnetic tunnel 440 to allow full utilization of the flux lines and all forces working together in the direction of motion.

As opposed to "pancake style" or axial flux electric motor, the longitudinal length or "width" of the outer walls 406 and 408 are greater than the radial or lateral depth (or length) of the side walls 402 and 404 as illustrated in FIGS. 7A-7C. This geometric proportion results in greater torque generation along the interface of the outer wall 406 and coil assembly 502. In certain alternate embodiments, the thickness of the magnets comprising the outer wall 406 may also be increased to increase the generation of torque. In any event, the contribution to torque from the outer wall 406 and the inner wall 408 may be greater than the contribution from the side walls 402 and 404 due to the geometry of the cross-section of the radial segment 420 and the varying radius of the components.

Although the core, coil assembly, and magnetic radial segments are illustrated in cross-section as rectangular, any cross-sectional shape may be used depending on the design and performance requirements for a particular motor or generator. In a preferred embodiment, there is more magnetic material positioned in or along an outer wall (such as the magnetic wall 406) along the longitudinal direction than magnetic material positioned in or along a radial wall (such as the axial or side walls 402 or 408). For instance, if the magnets forming the magnetic walls are all the same thickness, the length of the outer wall in the longitudinal direction is greater than the length of the axial or side walls in the radial direction. In alternative embodiments, the length of the magnets forming the outer magnetic wall may be the same or shorter than the length of the magnets forming the axial or side walls.

The unique configurations illustrated in FIGS. 7A-7C also leads to several unique properties. For instance, an individual coil 526 and core portion 504 will tend to move out of the tunnel 440 on its own accord (e.g. with no power applied). The natural tendency of this configuration is for the coil 526 to follow the flux lines to the nearest exit 412 or 414. Conversely if a current is applied the coil 526, the coil 526 will move though the entirety of the magnetic tunnel depending on polarity of the power applied. The encapsulation of the coil 526 in the magnetic flux of the magnetic tunnel 440 also allows all magnetic fields to be used to generate motor or electric power. Cogging effects can be reduced as the coil will tend to travel out of the tunnel when no current applied. This also means that the coil 526 does not have to be pulsed with an opposing magnetic field at any point while in the magnetic tunnel 440. Additionally, the coil 526 will travel through the entire magnetic tunnel 440 length with a single DC pulse of the correct polarity. Non-sinusoidal torque or voltage is generated throughout the duration of time that the coil 526 is under the influence of the magnetic tunnel 440 and alternating polarities are not required for this effect to occur.

Figure 7D:
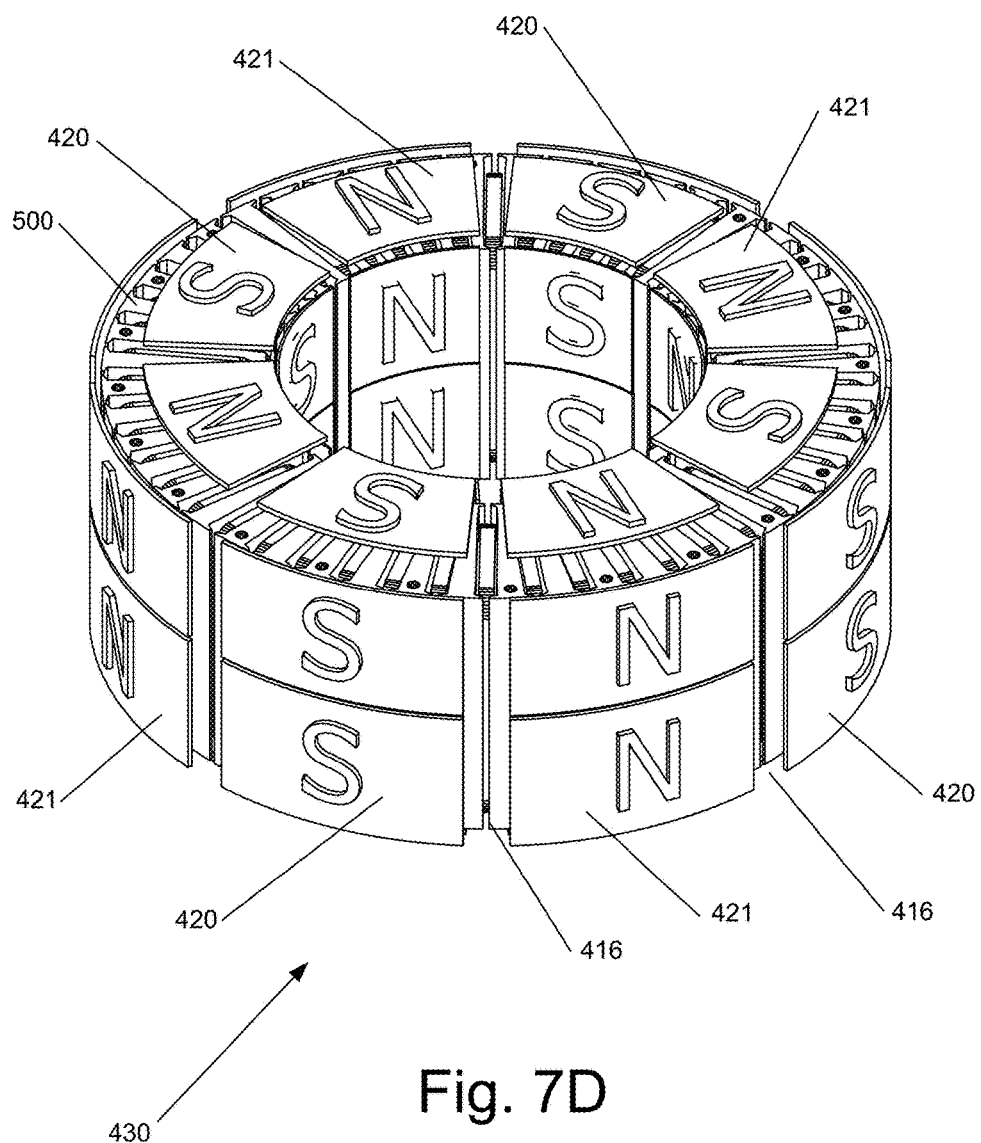
FIG. 7D illustrates one embodiment of the coil assembly of FIG. 4E positioned within the toroidal magnetic cylinder of FIG. 5.

As illustrated in FIG. 7D, the illustrative embodiment of the toroidal magnetic cylinder 430 comprises eight radial segments where four radial segments 421 are interspersed between the four radial segments 420. The four radial segments 421 are identical to the radial segments 420 except that the magnetic pole orientation of the magnets has been reversed. So, in the radial segment 420, all of the interior facing magnetic poles are north forming a NNNN magnetic tunnel configuration as illustrated in FIG. 7A. In contrast, in the radial segment 421, all of the interior facing magnetic poles are south forming a SSSS magnetic tunnel configuration. Thus, the tunnels radial segments 420 generate flux fields which are of an opposite polarity to the flux fields generated by the radial segments 421. In traditional motor terminology, each radial segment is a motor magnet pole. Thus, each radial segment is a three dimensional magnetic pole which can create a three dimensional symmetric magnetic field. Alternating the segments then produces a sinusoidal field.

With regard to the toroidal magnetic cylinder 430, each magnetic or radial segment (e.g. radial segments 420 or 421) has their respective magnetic configuration (NNNN or SSSS) of like magnetic polarities reversed for each adjacent radial segment. Although, an eight segment toroidal magnetic cylinder 430 is illustrated in FIG. 7D, in other embodiments, two, four, six, ten, etc. segments may be used. The number of segments selected for any given application may be based on engineering design parameters and the particular performance characteristics for an individual application. The scope of this invention specifically includes and contemplates multiple segments having an opposite polarity to the adjacent partial toroidal magnetic cylinders. For simplicity and illustrative purposes, an eight segment toroidal magnetic cylinder is described herein. However, this design choice is in no way meant to limit the choice or number of segments for any multi-segment toroidal magnetic cylinder.

In certain embodiments, the radial segments 420 and 421 may be sized to allow radial gaps 416 to form when the partial toroidal magnetic cylinders are assembled into the complete cylinder 430 as illustrated in FIG. 7D.

As described above, in certain embodiments, the individual magnets forming the toroidal magnetic cylinder 430 couple to various components of the back iron circuit 200. The back iron circuit 200 may be used to channel part of the magnetic flux path.

The Integrity of the Magnetic Tunnel

As described above in reference to FIGS. 6, 7A-7C, by surrounding a coil on all sides with "like" polarity magnets (e.g. all north poles or all south poles), the flux lines from those magnets are forced to travel through the center of the "magnetic tunnel" 404 formed by the surrounding magnets—along the radial or circumferential direction 422 (FIG. 7B) and eventually exit at the mouth or open ends 412 and 414 of the tunnel 440 (see FIG. 7C). The natural tendency of the flux lines is to flow along the shortest path—which is usually in the radial, lateral or "sideways" direction 434 (see FIG. 7B). Although some flux leakage may be acceptable, if the flux leakage is large, the integrity of the magnetic tunnel 440 will be compromised and the flux lines will no longer travel in the circumferential direction. If the flux lines do not travel in the circumferential direction, many of the advantages of certain embodiments will be lost.

As illustrated in FIG. 7A for instance, there are a number of slots or "gaps" between the magnet walls, such as the circumferential slot 410 or slot 411. These gaps may be carefully controlled or too much flux will leak through the gaps and essentially destroy the magnetic flux integrity of the magnetic tunnel 440. In an ideal world, there would be no slots or gaps in the tunnel and thus, it would be impossible for the flux lines to escape laterally. However, if there were no slots, it would be difficult to support the coil assembly and to providing electrical and cooling conduits to the coil assembly.

One method of controlling gap flux leakage is to limit the lateral width of the gaps. For instance, the total length of the sides of the "magnetic tunnel" may be substantially larger than the circular support mechanism slot and the slot reluctance may be high enough to force a circumferential magnetic flux field to form in the magnetic tunnel 440. As an example, limiting the lateral width of the circumferential slots to roughly a ratio of 1 unit of slot width to every 12 units of circumference/perimeter length may provide enough transverse flux lines to steer the majority of the flux lines along the circumferential direction 422 as discussed above.

Another solution is placing another group or group of magnets in close proximity with the slots such they generate an addition flux field lines across the gap or slot. For instance, two groups of magnets positioned on either side of coil assembly may produce enough "cross flux" to keep the flux in the magnetic tunnel from escaping. A magnet on one side of the slot may have its north pole facing the slot. An opposing magnet on the other side of the slot may have is south pole facing the slot. Thus, cross flux lines from the north pole to the south pole would be generated across the slot.

In one embodiment, permanent magnets orientated to provide a cross flux may be embedded in a coil assembly supporting structure or embedded in the back iron material. In other embodiments, powdered magnetic material may be used. In yet other embodiments, strongly diamagnetic materials (Pyrolytic carbon and superconductor magnets have been shown to be capable of rejecting force lines, and thus could be used.

Defining the Flux Path with the Back Iron Circuit

Figure 8:
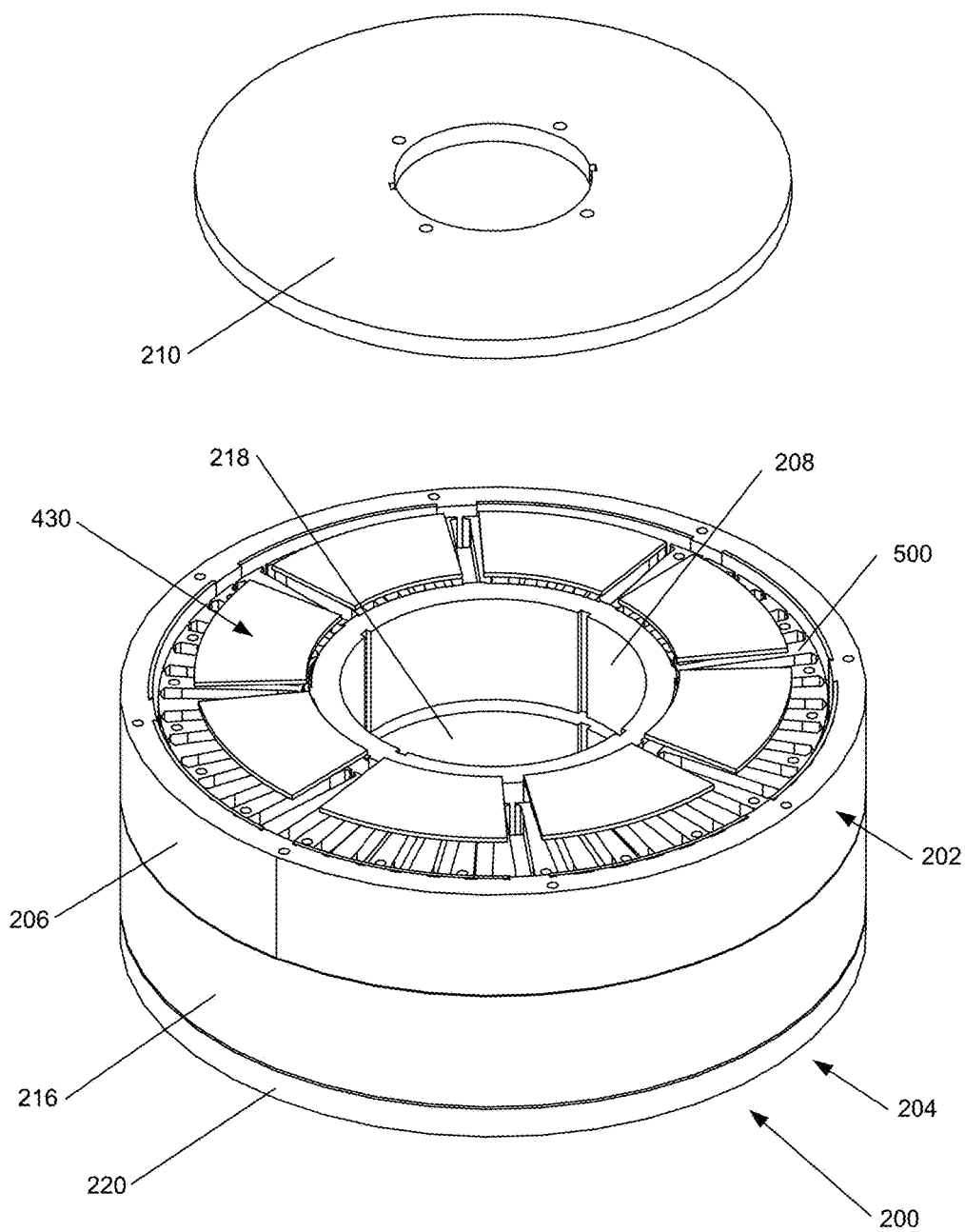
FIG. 8 illustrates the magnetic cylinder of FIG. 7D coupled to a back iron circuit with a portion of the side back iron circuit positioned in an exploded view for clarity.

FIG. 8 is an isometric view illustrating the coil assembly 500 positioned within the toroidal magnetic cylinder 430 which is coupled to and surrounded by the back iron circuit 200. The first flat side wall 210 has been repositioned in an exploded view for clarity. As described above, in the illustrative embodiment, the back iron circuit 200 may include a first side or axial wall 210 and the second side or axial wall 220. In this embodiment, the first outer cylindrical wall 206 and the second outer cylindrical wall 216 forms and couples to and surrounds the outer magnetic walls 406*a* and 406*b* of the toroidal magnetic cylinder 430, respectively (see FIG. 5). The first inner cylindrical wall 208 and the second inner cylindrical wall 218 is coupled to and surrounded by the inner wall magnets 408*a*-408*b* of the toroidal magnetic cylinder 430 (see FIG. 5). Thus, the entire back iron circuit 200 includes the inner cylindrical walls 208 and 218, the outer cylindrical walls 206 and 216, and the side or axial walls 210 and 220 as illustrated in FIG. 8. In certain embodiments, the back iron circuit 200 combined with the toroidal magnetic cylinder 430 may form a rotor (or a stator depending on the motor configuration). In certain embodiments, the back iron circuit 200 may be used to channel part of the magnetic flux path. The back iron material channels the magnetic flux produced by the toroidal magnetic cylinder 430 through the back iron material (as opposed to air) to reduce the reluctance of the magnetic circuit. In certain embodiments, therefore, the amount or thickness of the magnets forming the toroidal magnetic cylinder (if permanent magnets are used) may be reduced when using the appropriately designed back iron circuit.

Applying Mechanical Torque or Current

In "motor" mode, current is induced in the coils 526, which will cause electromotive forces to move the coil assembly 500 relative to the toroidal magnetic cylinder 430 or vice versa. In "generator" mode, on the other hand, the movement of the coil assembly 500 relative to the toroidal magnetic cylinder 430 will cause current to be generated in the individual coils 526 to produce a DC current as the individual coils move through each tunnel or radial segment 420 or 421.

In order to maintain the generated torque and/or power the individual coils 526 in the coil assembly 500 may be selectively energized or activated by way of a switching or controller (not shown). The individual coils 526 in the coil assembly 500 may be electrically, physically, and communicatively coupled to switching or controller which selectively and operatively provides electrical current to the individual coils in a conventional manner.

For instance, the controller may cause current to flow within an individual coil 526 when the individual coil is within a magnetic tunnel segment 420 with a NNNN magnetic pole configuration as illustrated in FIG. 7D. On the other hand, when the same individual coil rotates into an adjacent magnetic tunnel segment 421 with a SSSS magnetic pole configuration, the controller causes the current within the individual coil 526 to flow in a direction opposite to that when the coil was in the NNNN magnetic pole segment 420 so that the generated magnetic force is in the same direction as coil rotates from one adjacent magnetic segment to the other.

As discussed above, the individual coils 526 may use toroidal winding without end windings and in some embodiments, the individual coils may be connected to each other in series. In other embodiments, a multi-phasic winding arrangement such as six phase, three phase, etc. winding connection may be used where the proper coils 526 are connected together to form a branch of each phase. For instance, two adjacent coils may be phase A coils, the next two adjacent coils may be phase B coils, and the next two adjacent coils may be phase C coils. This three phase configuration would then repeat for all individual coils 526 within the coil assembly 500. In one embodiment, there are eight (8) pairs of adjacent phase A coils for a total of 16 phase A coils. Similarly, there are eight (8) pairs of adjacent phase B coils for a total of 16 phase B coils, and there are eight (8) pairs of adjacent phase C coils for a total of 16 phase C coils. Thus, in such an embodiment, there are 48 individual coils.

When the coils are energized, the multi-phasic winding can produce a rotating magnetomotive force in the air gap around the coil assembly 500. The rotating magnetomotive force interacts with the magnetic field generated by the toroidal magnetic tunnel 430, which in turn produces torque on all sides of the coil assembly 500 and relative movement between the coil assembly and the toroidal magnetic tunnel.

In such embodiments, the individual coils 526 may be connected to a brushless motor controller (not shown) to be activated by a controller or in a similar manner known in the art. For each phase, the motor controller can apply forward current, reverse current, or no current. In operation, the motor controller applies current to the phases in a sequence that continuously imparts torque to turn the magnetic toroidal tunnel in a desired direction (relative to the coil assembly) in motor mode. In certain embodiments, the motor controller can decode the rotor position from signals from position sensors or can infer the rotor position based on back-emf produced by each phase. In certain embodiments, two controllers may be used. In other embodiments, a single controller may be used. The controller(s) controls the application of current of the proper polarity for the proper amount of time at the right time and controls the voltage/current for speed control. Regardless, the controllers allow for a switching action and a varying voltage action.

In other embodiments, a brushed motor/generator may be used. In such embodiments, one or more commutators (not shown) may be used and positioned, for instance, within the rotor hub 300 (see FIG. 1). In certain embodiments, the number of brushes used may equal the number of toroidal magnetic segments used in the design of the particular motor/generator. For instance, if eight toroidal magnetic segments are used, then eight brushes may be used. The individual coils 526 in the coil assembly 500 may be connected in series having toroidal wound windings. In a brushed design in motor mode, a simplified reverse switching circuit is all that is necessary to switch the current direction as the coils enter and exit the respective toroidal magnetic segment.

A Motor/Generator Embodiment

Figure 9A:
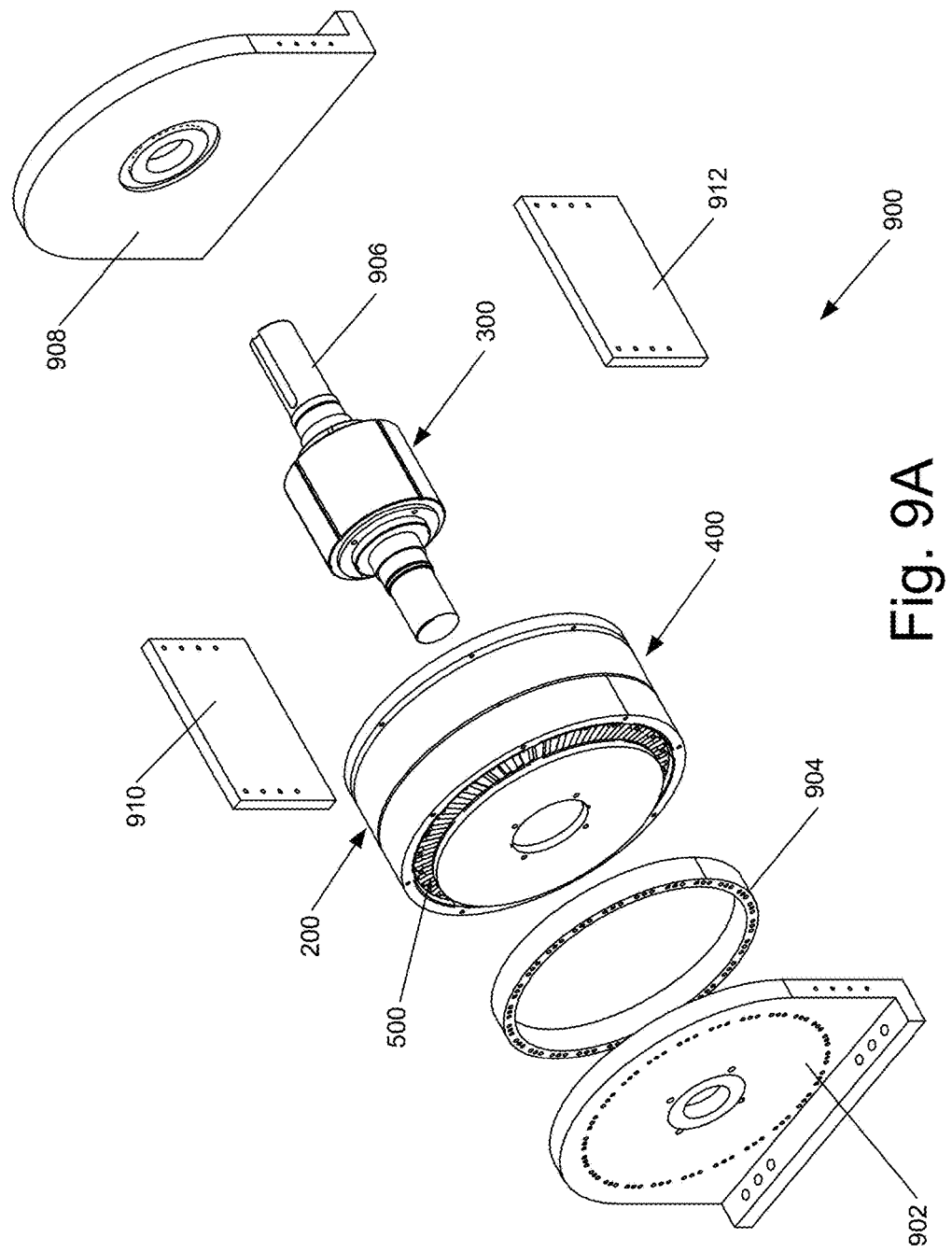
FIG. 9A is an exploded view of the magnetic cylinder and back iron circuit of FIG. 8 coupled to additional structures to form a motor/generator.
Figure 9B:
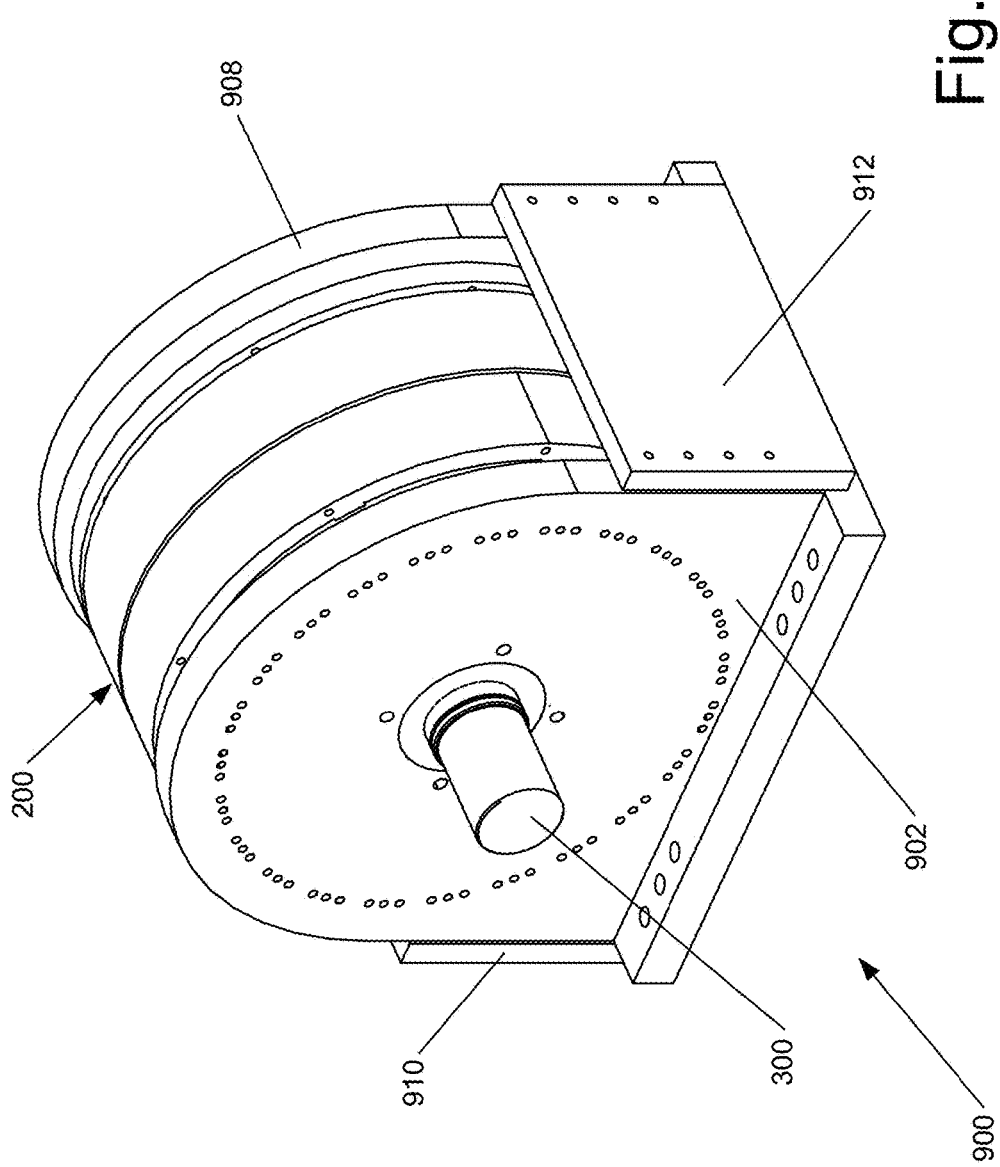
FIG. 9B is an isometric view of the magnetic cylinder and back iron circuit of FIG. 8 coupled to additional structures to form a motor/generator.

FIG. 9A is an exploded view of one configuration of a system 900 using the back iron circuit 200 and the toroidal magnetic cylinder 430 as a rotor and the coil assembly 500 as a stator. FIG. 9B is an isometric view of the assembled system 900 of FIG. 9B. In FIGS. 9A and 9B, the back iron circuit 200 surrounds the toroidal magnetic cylinder 430 and the coil assembly 500 to form the magnetic disc assembly 400 (the toroidal magnetic cylinder 430 is not visible in FIGS. 9A and 9B). In certain embodiments, the system 900 includes a stator side end plate 902 and an extension or support ring 904 which fixedly couples the coil assembly 500 to the stator side end plate 902 (see FIG. 10).

An end of a rotor shaft 906 extends through the stator side end plate 902. The rotor hub 300 couples to a rotor shaft 906 and supports the back iron circuit 200, which in turn supports the toroidal magnetic cylinder 430 (not visible in FIGS. 9A and 9B). The opposing end of the rotor shaft 906 is supported by the rotor side end plate 908. When assembled, in one embodiment, a pair of side plates 910 and 912 couple the stator side end plate 902 to the rotor side end plate 908 as illustrated in FIG. 9B. As is known in the art, the rotor shaft 906 is a mechanical load transferring device that either inputs a mechanical rotation force into the system when in generator mode or produces a mechanical rotational force when the system is in motor mode.

Figure 10:
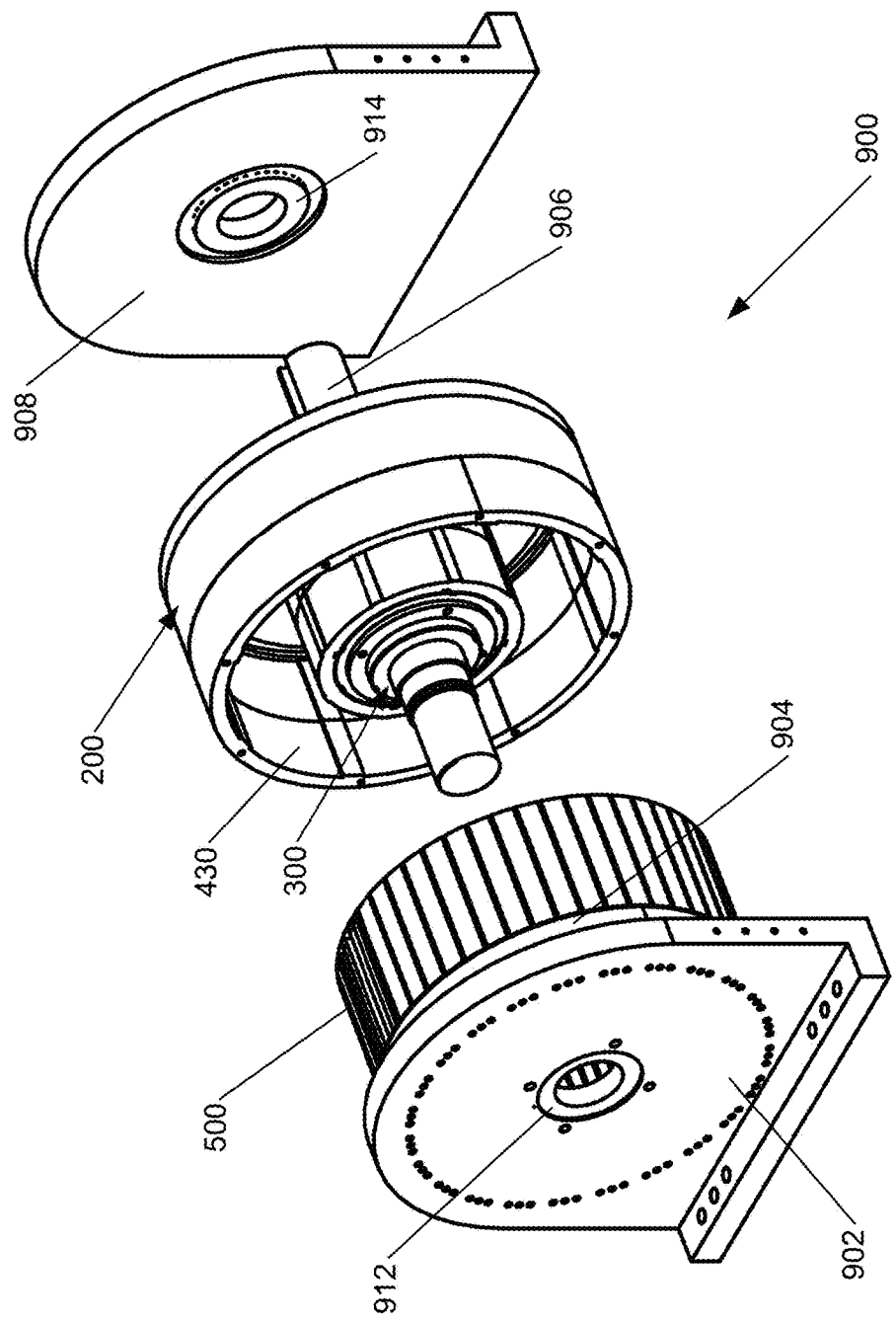
FIG. 10 is an alternative exploded view of the motor/generator of FIGS. 9A and 9B illustrating the stationary and rotating elements.

FIG. 10 is another exploded illustration of the system 900 where the stator or coil assembly 500 is coupled to and supported by the stator end plate 902 via the extension ring 904. Thus, the end plates 902 and 908, the extension ring 904, and the coil assembly 500 (the stator) are stationary in this configuration. In contrast, the rotor hub 300 is fixedly coupled to the back iron circuit 200 which supports and positions the toroidal magnetic cylinder 430. The rotor shaft 906 is structurally supported by the stator end plate 902 and the rotor end plate 908. Bearing units 912 and 914 are positioned between the rotor shaft ends and the end plates to allow the rotor shaft to rotate with respect to the end plates. Thus, as illustrated in FIG. 10, the coil assembly 500 (or stator) and toroidal magnetic disc 430 and the back iron circuit 200 (or rotor) each have their own individual end plates 902 and 908, respectively—which will secure the entire arrangement of the machine and will ensure the integrity of the rotating components.

In certain embodiments, wires and cooling medium may enter the coil assembly 500 from the dedicated end plate 902 via the extension ring 904. In contrast, the rotating components (the toroidal magnetic disc 430 and the back iron circuit 200) may be coupled together and will be coupled in tandem with the rotor hub 300, which in turn is fixedly coupled to the shaft 906.

Figure 11:
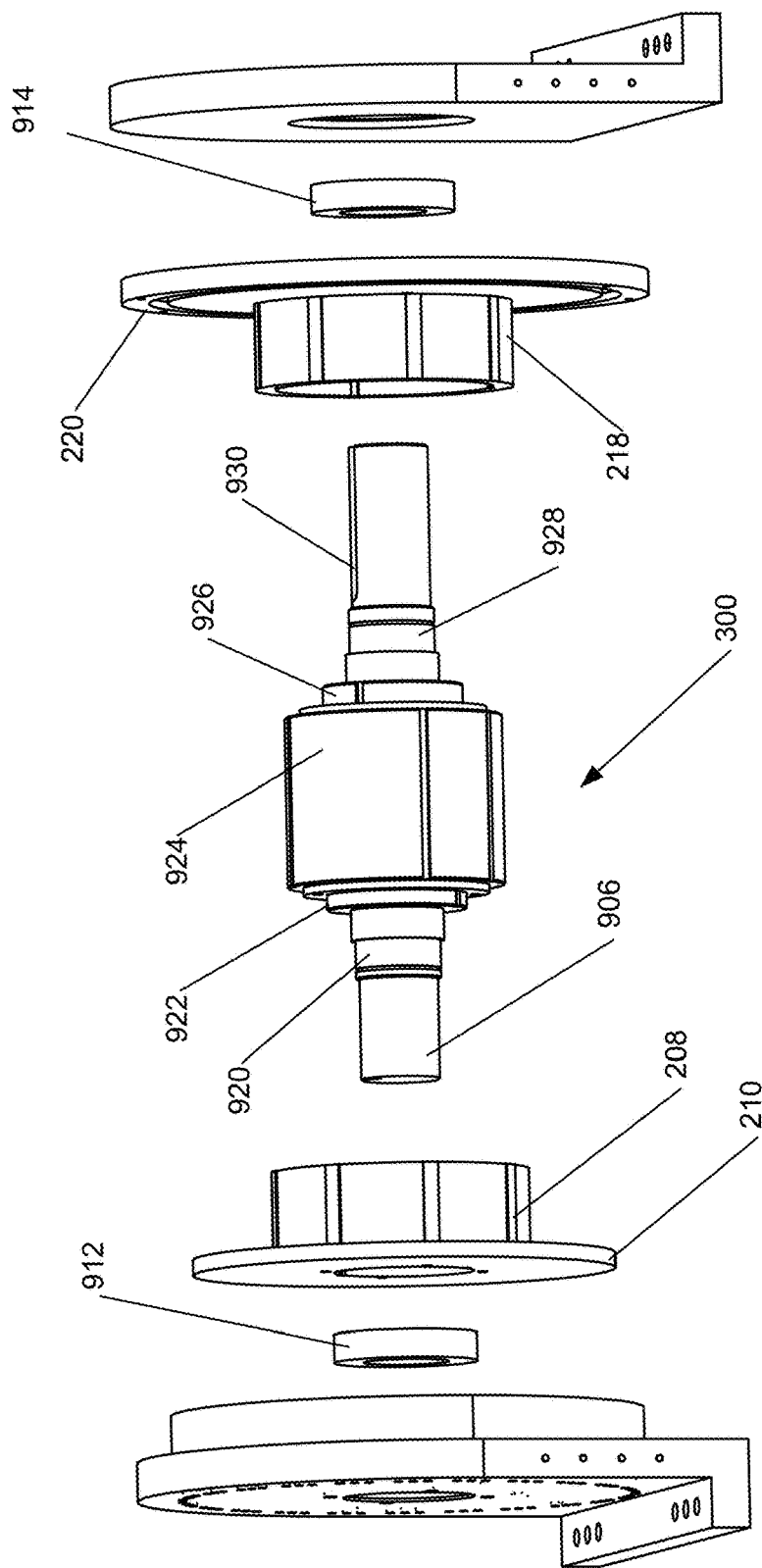
FIG. 11 is a perspective view of a rotor hub and certain elements of the motor/generator.

FIG. 11 is a partial exploded view illustrating certain details regarding the rotor hub 300. Besides the rotor shaft 906, the rotor hub 300 includes a plurality of support shoulders positioned longitudinally along the length of the shaft. A first bearing support shoulder 920 engages and supports the bearing unit 912. A first centering shoulder 922 couples to and supports the first side wall 210 of the back iron circuit 200 (not completely shown). A center shoulder 924 engages with and supports the inner cylindrical walls 208 and 218 of the back iron circuit 200 (see also FIG. 8). A second centering shoulder 926 supports the side wall 220 of the back iron circuit 200. A second bearing support shoulder 928 is designed to engage with and support the second bearing unit 914. In certain embodiments, a keyway 930 may be defined in either end (or both ends) of the rotor shaft 906.

In the embodiment illustrated in FIGS. 9A-11, the coil assembly 500 is the stator. In other configurations, the coil assembly 500 may be a rotor. Furthermore, the embodiments as illustrated is only one way of configuring and supporting the coil assembly 500. In other embodiments the coil assembly 500 may be supported by support ring extending through a center slot between the outer cylindrical walls 206 and 216 from the coil assembly to an exterior casing or housing. In yet other embodiments when the coil assembly 500 is functioning as a rotor, the coil assembly may be supported by a support ring extending through a center slot between the inner cylindrical walls 208 and 218 from the coil assembly to the a shaft. The exact configuration depends on design choices as to whether the coil assembly is to be the stator or the rotor.

Advantages of Certain Embodiments

In sum, certain disclosed embodiments have several advantages when compared to traditional motors and generators. Surrounding the coils with magnets as described above creates more flux density and the forces are now all in the direction of motion which may create more torque, minimize vibration, and minimize noise—as compared to conventional motors where forces may try to pull the coil downwards or push it upwards (depending on the polarity), not in the direction of motion. As discussed above, most of the magnetic fields generated are in the direction of motion so there is little, if any, wasted field structure. Continuous torque and continuous power, therefore, are greatly increased. Furthermore, continuous torque density, continuous power density by volume, and continuous power density by weight are also increased when compared to conventional electric motors.

In certain embodiments, the equivalent full torque is available at start with no locked rotor current losses. The permanent magnet configuration has reduced inrush current at start.

In certain embodiments, the coil assembly may be compact and yet the coils are easily cooled because they are surrounded by an effective heat sink. Because there is no reason to overlap the coil windings, there is little, if any, unwanted field induction—which also contributes to a more efficient design. One of the advantages of this configuration over conventional motors is that the end turns (in this case the radial section of the coils) are part of the "active section" of the invention. In conventional motors, the axial length of the copper conductor is the section that produces power. The end turns are a penalty, adding weight and losses, but not producing power because the end region fields are not effectively linking the end windings. However, in the above disclosed embodiments, the entire coil winding is effectively used to produce torque due to the side wall or axial magnets which are axially magnetized—efficiently utilizing the copper windings.

In the "DC" configuration, the motor may run independent of power line frequency or manufactured frequencies reducing the need for expensive pulse width modulated drive controllers or similar controllers.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other wall portion, components or features and still be within the scope of the present invention, for instance:

In one embodiment, there may be a method of producing mechanical rotation, the method including: forming an area of magnetic concentration within a first interior cavity defined in section by an outer magnetic cylinder wall portion having a first longitudinal length, an inner magnetic cylinder wall portion, a first magnetic side wall portion having a first radial length, and a second magnetic side wall portion having a second radial length, each wall portion having their like magnetic poles facing the first interior cavity and the outer magnetic cylinder wall portion including more magnetic material than the first magnetic side wall portion or the second magnetic side wall portion, forming a second area of magnetic concentration within a second interior cavity defined in section by an second outer magnetic cylinder wall portion having a first longitudinal length, a second inner magnetic cylinder wall portion, a third magnetic side wall portion having a first radial length, and a fourth magnetic side wall portion having a second radial length, each wall portion having their like magnetic poles facing away from the second interior cavity and the second outer magnetic cylinder wall portion including more magnetic material than the third magnetic side wall portion or the fourth magnetic side wall portion, positioning a coil within the first interior cavity, applying a current in a first direction to the coil to cause the coil to move to the second interior cavity, applying a current in a second direction to the coil when the coil is within the second interior cavity to move the coil out of the second interior cavity, and coupling a longitudinal shaft to the coil such that as the coil rotates from the first interior cavity to the second interior cavity, the longitudinal shaft rotates.

In another embodiment, there may be a method of producing mechanical rotation, the method including: forming an area of magnetic concentration within a first interior cavity defined in section by an outer magnetic cylinder wall portion having a first longitudinal length, an inner magnetic cylinder wall portion, a first magnetic side wall portion having a first radial length, and a second magnetic side wall portion having a second radial length, each wall portion having their like magnetic poles facing the first interior cavity and the outer magnetic cylinder wall portion including more magnetic material than the first magnetic side wall portion or the second magnetic side wall portion, forming a second area of magnetic concentration within a second interior cavity defined in section by an second outer magnetic cylinder wall portion having a first longitudinal length, a second inner magnetic cylinder wall portion, a third magnetic side wall portion having a first radial length, and a fourth magnetic side wall portion having a second radial length, each wall portion having their like magnetic poles facing away from the second interior cavity and the second outer magnetic cylinder wall portion including more magnetic material than the third magnetic side wall portion or the fourth magnetic side wall portion, positioning the first interior cavity about a first coil, applying a current in a first direction to the first coil to cause the first interior cavity to move relative to the first coil, positioning the second interior cavity about the first coil, applying a current in a second direction to the first coil when the first coil is within the second interior cavity to cause the second interior cavity to move relative to the first coil, and coupling a longitudinal shaft to the walls forming the first and second interior cavities such that as the first and second cavities rotate, the longitudinal shaft rotates.

Additionally, undescribed embodiments which have interchanged components are still within the scope of the present invention. It is intended that the scope of the invention be limited not by this detailed description, but rather by the claims or future claims supported by the disclosure.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112(f). Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC 112(f).

The invention claimed is:

1. An electric motor/generator comprising:
a plurality of first tunnel segments and second tunnel segments arranged to form a magnetic toroidal cylinder having a longitudinal axis, wherein the plurality of first tunnel segments and second tunnel segments are positioned about the longitudinal axis in an alternating manner to form a tunnel, each of the first tunnel segments and second tunnel segments having
an outer magnetic cylinder wall portion oriented parallel to the longitudinal axis,
an inner magnetic cylinder wall portion oriented parallel to the longitudinal axis,
a first magnetic side wall portion oriented perpendicular to the longitudinal axis, and
a second magnetic side wall portion oriented perpendicular to the longitudinal axis,
wherein the outer magnetic cylinder wall portion includes more magnetic material than is included in the first magnetic side wall portion or the second magnetic side wall portion;
wherein, in each of the first tunnel segments, the outer magnetic cylinder wall portion, the inner magnetic cylinder wall portion, the first magnetic side wall portion, and the second magnetic side wall portion are positioned to form a portion of the tunnel with their like magnetic poles facing the tunnel, and
wherein, in each of the second tunnel segments, the outer magnetic cylinder wall portion, the inner magnetic cylinder wall portion, the first magnetic side wall portion, and the second magnetic side wall portion are positioned to form a portion of the tunnel with their like magnetic poles facing away from the tunnel, a coil assembly positioned about the longitudinal axis and within the magnetic toroidal cylinder, the coil assembly including a core at least partially positioned within the tunnel, and a plurality of coils arranged around the core, wherein the plurality of coils are separated by a plurality of teeth extending radially from the core, wherein the magnetic toroidal cylinder is adapted to rotate relative to the coil assembly.

2. The electric motor/generator of claim 1 wherein, for each of the first tunnel segments and the second tunnel segments, a longitudinal length of the outer magnetic cylinder wall portion is greater than a radial length of the first magnetic wall portion or a radial length of the second side wall portion.

3. The electric motor/generator of claim 1 wherein, for each of the first tunnel segments and the second tunnel segments, a longitudinal length of the outer magnetic cylinder wall portion is identical to a radial length of the first magnetic wall portion and a radial length of the second side wall portion.

4. The electric motor/generator of claim 1 wherein, for each of the first tunnel segments and the second tunnel segments, a longitudinal length of the outer magnetic cylinder wall portion is less than a radial length of the first magnetic wall portion or a radial length of the second side wall portion.

5. The electric motor/generator of claim 1 wherein the plurality of teeth define a slot between each adjacent pair of teeth, and wherein each of the plurality of coils is positioned in one of the slots.

6. The electric motor/generator of claim 1 wherein each tooth in the plurality of teeth has an outer pair of fins and an inner pair of fins extending in a tangential direction.

7. The electric motor/generator of claim 6 wherein each tooth in the plurality of teeth has a first pair of radial fins connecting the outer and inner pair of fins together and an opposing pair of radial fins connecting the outer and inner pair of fins together.

8. The electric motor/generator of claim 1 wherein the coil assembly is formed from the group of materials consisting of a soft magnetic material, hard magnetic material, a composite material, an ferrous alloy, or a laminated material.

9. The electric motor/generator of claim 1, wherein adjacent coils are connecting together to form a branch of a multi-phase winding pattern.

10. The electric motor/generator of claim 1, wherein the coil assembly has a plurality of internal chambers with electric conductors positioned therein.

11. The electric motor/generator of claim 1, wherein the coil assembly has a plurality of internal chambers to allow for cooling of the coils.

12. The electric motor/generator of claim 1, where the magnetic toroidal cylinder comprises eight tunnel segments including four first tunnel segments with NNNN magnetic configuration interspersed among four second tunnel segments with SSSS magnetic configuration.

13. The electric motor/generator of claim 12, further comprising a controller adapted to cause a first current direction to flow within an individual coil when within a first tunnel segment with the NNNN magnetic configuration and causing a second current of the opposite direction to be generated when the individual coil is within a second tunnel segment with the SSSS magnetic configuration.

14. The electric motor/generator of claim 1, where the magnetic toroidal cylinder defines at least one generally circular slot and includes magnets positioned proximal to the circular slot such that a cross magnetic field is established across the circular slot.

15. The electric motor/generator of claim 14, wherein the circular slot is defined within or adjacent to the first side wall portion.

16. The electric motor/generator of claim 1, further comprising an extension ring fixedly coupled to the coil assembly and a side plate fixedly coupled to the extension ring where the extension ring and side plate includes passages for electrical conductors and cooling medium.

17. The electric motor/generator of claim 1, further comprising a back iron circuit fixedly coupled to the magnetic toroidal cylinder and a rotor hub fixedly coupled to the back iron circuit.

18. A method of producing mechanical rotation, the method comprising:

forming an area of magnetic concentration within a first interior cavity defined in section by an outer magnetic cylinder wall portion having a first longitudinal length, an inner magnetic cylinder wall portion, a first magnetic side wall portion having a first radial length, and a second magnetic side wall portion having a second radial length, each wall portion having their like magnetic poles facing the first interior cavity and the outer magnetic cylinder wall portion including more magnetic material than the first magnetic side wall portion or the second magnetic side wall portion, forming a second area of magnetic concentration within a second interior cavity defined in section by an second outer magnetic cylinder wall portion having a first longitudinal length, a second inner magnetic cylinder wall portion, a third magnetic side wall portion having a first radial length, and a fourth magnetic side wall portion having a second radial length, each wall portion having their like magnetic poles facing away from the second interior cavity and the second outer magnetic cylinder wall portion including more magnetic material than the third magnetic side wall portion or the fourth magnetic side wall portion, positioning a coil within the first interior cavity, applying a current in a first direction to the coil to cause the coil to move to the second interior cavity, applying a current in a second direction to the coil when the coil is within the second interior cavity to move the coil out of the second interior cavity, and coupling a longitudinal shaft to the coil such that as the coil rotates from the first interior cavity to the second interior cavity, the longitudinal shaft rotates.

19. A method of producing mechanical rotation, the method comprising:

forming an area of magnetic concentration within a first interior cavity defined in section by an outer magnetic cylinder wall portion having a first longitudinal length, an inner magnetic cylinder wall portion, a first magnetic side wall portion having a first radial length, and a second magnetic side wall portion having a second radial length, each wall portion having their like magnetic poles facing the first interior cavity and the outer magnetic cylinder wall portion including more magnetic material than the first magnetic side wall portion or the second magnetic side wall portion, forming a second area of magnetic concentration within a second interior cavity defined in section by an second outer magnetic cylinder wall portion having a first longitudinal length, a second inner magnetic cylinder wall portion, a third magnetic side wall portion having a first radial length, and a fourth magnetic side wall portion having a second radial length, each wall portion having their like magnetic poles facing away from the second interior cavity and the second outer magnetic cylinder wall portion including more magnetic material than the third magnetic side wall portion or the fourth magnetic side wall portion, positioning the first interior cavity about a first coil, applying a current in a first direction to the first coil to cause the first interior cavity to move relative to the first coil, positioning the second interior cavity about the first coil, applying a current in a second direction to the first coil when the first coil is within the second interior cavity to cause the second interior cavity to move relative to the first coil, and coupling a longitudinal shaft to the walls forming the first and second interior cavities such that as the first and second cavities rotate, the longitudinal shaft rotates.

\* \* \* \* \*